(12) United States Patent
Snyder

(10) Patent No.: US 9,512,805 B2
(45) Date of Patent: Dec. 6, 2016

(54) CONTINUOUS DETONATION COMBUSTION ENGINE AND SYSTEM

(71) Applicant: Rolls-Royce North American Technologies, Inc., Indianapolis, IN (US)

(72) Inventor: Philip H. Snyder, Avon, IN (US)

(73) Assignee: Rolls-Royce North American Technologies, Inc., Indianapolis, IN (US)

(*) Notice: Subject to any disclaimer, the term of this patent is extended or adjusted under 35 U.S.C. 154(b) by 550 days.

(21) Appl. No.: 14/213,426

(22) Filed: Mar. 14, 2014

(65) Prior Publication Data

US 2015/0128599 A1    May 14, 2015

Related U.S. Application Data

(60) Provisional application No. 61/798,779, filed on Mar. 15, 2013, provisional application No. 61/801,481, filed on Mar. 15, 2013.

(51) Int. Cl.
| | | |
|---|---|---|
| *F02C 5/12* | (2006.01) | |
| *F02K 7/06* | (2006.01) | |
| (Continued) | | |

(52) U.S. Cl.
CPC . *F02K 7/06* (2013.01); *F02C 5/12* (2013.01); *F23R 3/04* (2013.01); *F23R 3/50* (2013.01); *F23R 7/00* (2013.01); *F01D 5/026* (2013.01); *F02C 3/14* (2013.01); *F23R 3/28* (2013.01); *Y02T 50/672* (2013.01); *Y02T 50/675* (2013.01)

(58) Field of Classification Search
CPC ............... F02C 5/12; F02K 7/06; F23R 3/50; F23R 3/52
See application file for complete search history.

(56) References Cited

U.S. PATENT DOCUMENTS

| | | | |
|---|---|---|---|
| 761,118 A | 5/1904 | Weever | |
| 2,930,196 A | 3/1960 | Hertzberg et al. | |
| (Continued) | | | |

FOREIGN PATENT DOCUMENTS

| | | | | |
|---|---|---|---|---|
| GB | 1069217 | * | 5/1967 | ............... F02C 5/10 |
| WO | 2011037597 A1 | | 3/2011 | |
| WO | 2012142485 A2 | | 10/2012 | |
| WO | WO2012142485 A2 | * | 10/2012 | ............... F02K 7/06 |

OTHER PUBLICATIONS

Braun et al., "Air breathing Rotating Detonation Wave Engine Cycle Analysis" AIAA-2010-7039, 46th AIAA/ASME/SAE/ASEE Joint Propulsion Conference & Exhibit, Nashville, TN, Jul. 25-28, 2010, pp. 1-13.*

(Continued)

*Primary Examiner* — Lorne Meade
(74) *Attorney, Agent, or Firm* — Barnes & Thornburg LLP

(57) ABSTRACT

One embodiment of the present disclosure is a gas turbine engine. Another embodiment is a unique combustion system. Another embodiment is a unique engine. Other embodiments include apparatuses, systems, devices, hardware, methods, and combinations for employing continuous detonation combustion processes. Further embodiments, forms, features, aspects, benefits, and advantages of the present application will become apparent from the description and figures provided herewith.

19 Claims, 16 Drawing Sheets

(51) Int. Cl.
  *F23R 3/50* (2006.01)
  *F23R 7/00* (2006.01)
  *F23R 3/04* (2006.01)
  *F01D 5/02* (2006.01)
  *F02C 3/14* (2006.01)
  *F23R 3/28* (2006.01)

(56) References Cited

U.S. PATENT DOCUMENTS

| | | | |
|---|---|---|---|
| 3,164,318 A | | 1/1965 | Barnes et al. |
| 3,217,491 A | * | 11/1965 | Funk .................. F02K 7/00 431/1 |
| 3,588,298 A | | 6/1971 | Edwards |
| 3,811,796 A | | 5/1974 | Coleman et al. |
| 3,879,937 A | | 4/1975 | Jenny |
| 4,398,868 A | | 8/1983 | Komauer et al. |
| 5,069,600 A | | 12/1991 | Althaus et al. |
| 5,267,432 A | | 12/1993 | Paxson |
| 5,513,489 A | * | 5/1996 | Bussing .................. B01J 3/08 60/255 |
| 5,916,125 A | | 6/1999 | Snyder |
| 6,351,934 B2 | | 3/2002 | Snyder |
| 6,439,209 B1 | | 8/2002 | Wenger et al. |
| 6,449,939 B1 | | 9/2002 | Snyder |
| 6,584,765 B1 | * | 7/2003 | Tew .................. B64G 1/401 60/247 |
| 6,845,620 B2 | | 1/2005 | Nalim |
| 6,988,493 B2 | | 1/2006 | Wenger et al. |
| 7,124,573 B2 | * | 10/2006 | Venkataramani ......... F02K 7/02 60/247 |
| 7,137,243 B2 | | 11/2006 | Snyder et al. |
| 7,520,123 B2 | | 4/2009 | Saddoughi et al. |
| 7,621,118 B2 | | 11/2009 | Snyder et al. |
| 7,784,267 B2 | * | 8/2010 | Tobita .................. C23C 24/04 60/247 |
| 7,891,164 B2 | | 2/2011 | Janssen et al. |
| 8,117,828 B2 | | 2/2012 | Snyder et al. |
| 9,046,057 B2 | * | 6/2015 | Efremkin .................. F02K 1/28 |
| 2009/0158748 A1 | | 6/2009 | Nordeen |
| 2012/0216503 A1 | | 8/2012 | Snyder |
| 2012/0216504 A1 | | 8/2012 | Snyder |
| 2014/0196460 A1 | * | 7/2014 | Falempin .................. F02K 7/08 60/767 |
| 2014/0245714 A1 | * | 9/2014 | Falempin .................. F02C 3/14 60/39.52 |

OTHER PUBLICATIONS

Falempin, F., "Continuous Detonation Wave Engine", Advances on Propulsion Technology for High-Speed Aircraft, RTO-EN-AVT-150, Paper 8, Neuilly-sur-Seine, France, 2008, pp. 8-1 to 8-16.*

Lu, et al., "Rotating Detonation Wave Propulsion: Experimental Challenges, Modeling, and Engine Concepts", AIAA-2011-6043, 47th AIAA/ASME/SAE/ASEE Joint Propulsion Conference & Exhibit, San Diego, CA, Jul. 31-Aug. 3, 2011, pp. 1-20.*
Kailasanath, K., "Review of Propulsion Applications of Detonation Waves", AIAA Journal, vol. 38, No. 9, Sep. 2000, pp. 1698-1708.*
Jack Wilson, Gerard E. Welch, Daniel E. Paxson, "Experimental Results of Performance Tests on a Four-Port Wave Rotor," AIAA 2007-1250.
Snyder, Philip H. and Nalim, M. Razi, "Pressure Gain Combustion Application to Marine and Industrial Gas Turbines", ASME GT2012-69886, Proceedings of the ASME Turbo Expo Jun. 11-15, 2012.
Snyder, P.H., Elharis, T.M., Wijeyakulsunya, S.D., M. Razi Nalim, Matsutomi, Y., and Meyer S.E., "Pressure Gain Combustor Component Viability Assessment Based on Initial Testing," AIAA paper 2011-5749, 47th AIAA/ASME/SAE/ASEE Joint Propulsion Conference, San Diego CA, 2011.
Akbari, P., Nalim M.R., Donovan, E.S. and Snyder, P.H., "Leakage Assessment of Pressure-Exchange Wave Rotors," AIAA Journal of Propulsion & Power, vol. 24, No. 4, Jul.-Aug. 2008.
Akbari, P., Nalim, R., and Snyder, P.H., "Numerical Simulation and Design of a Combustion Wave Rotor for Deflagrative and Detonative Propagation" AIAA paper 2006-5134.
B. Alparslan, M.R. Nalim, and P.H. Snyder, "Wave Rotor Combustor Test Rig Preliminary Design" 2004 International Mechanical Engineering Congress, ASME Paper IMECE2004-61795, Nov. 2004.
Snyder, P.H., Alparslan, B., and Nalim, M.R., "Gas Dynamic Analysis of the CVC, A Novel Detonation Cycle," AIAA paper 2002-4069, Joint Propulsion Conference 2002, Indianapolis, IN.
Smith, C.F., Snyder, P.H., Emmerson, S.W., "Impact of the Constant Volume Comustor on a Supersonic Turbofan Engine," AIAA paper 2002-3916, Joint Propulsion Conference 2002, Indianapolis.
Welch, G.E., Paxson, D.E., Wilson, J., and Snyder, P.H., "Wave-Rotor Enhanced Gas Turbine Engine Demonstrator," RTO-MP-34, AC/323(AVT)TP/14 presented at the Gas Turbine Operation and Technology for Land, Sea and Air Propulsion and Power Systems Symposium sponsored by the North Atlantic Treaty Organization's Research and Technology Organization, Ottawa, Canada, Oct. 18-21, 1999.
Weber, K.F., and Snyder, P.H., "Wave Rotor High Pressure Turbine Transition Duct Flow Analysis", AIAA Paper 98-3250.
Gegg, S.G., and Snyder, P.H., "Aerodynamic Design of a Wave Rotor to High Pressure Turbine Transition Duct," AOAA-98-3249, Jul. 1998.
Akbari, Pezhman, Nalim, Razi and Mueller, Norbert, "A Review of Wave Rotor Technology and Its Applications." Journal of Engineering for Gas Turbines and Power, Oct. 2006, vol. 128.
International Search Report and Written Opinion for International Application No. PCT/US2014/028936, Jan. 26, 2015, 10 pages.

* cited by examiner

CONTINUOUS DETONATION COMBUSTION ENGINE AND SYSTEM

CROSS REFERENCE TO RELATED APPLICATIONS

This application claims priority to and the benefit of U.S. Provisional Patent Application No. 61/798,779, filed 15 Mar. 2013, the disclosure of which is now expressly incorporated herein by reference, and claims priority to and the benefit of U.S. Provisional Patent Application No. 61/801,481, filed 15 Mar. 2013, the disclosure of which is now expressly incorporated herein by reference.

TECHNICAL FIELD

The present disclosure relates to heat engines. More particularly, the present disclosure relates to heat engines employing continuous detonation combustion.

BACKGROUND

Engine and combustion systems that effectively employ continuous detonation combustion processes remain an area of interest. Some existing systems have various shortcomings, drawbacks, and disadvantages relative to certain applications. Accordingly, there remains a need for further contributions in this area of technology.

SUMMARY

One embodiment of the present disclosure is a gas turbine engine. Another embodiment is a unique combustion system. Another embodiment is a unique engine. Other embodiments include apparatuses, systems, devices, hardware, methods, and combinations for employing continuous detonation combustion processes. Further embodiments, forms, features, aspects, benefits, and advantages of the present application will become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
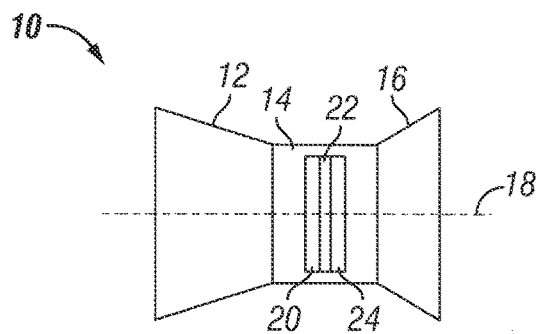
FIG. 1 schematically depicts some aspects of a non-limiting example of an engine in accordance with an embodiment of the present disclosure.

For purposes of promoting an understanding of the principles of the disclosure, reference will now be made to the embodiments illustrated in the drawings, and specific language will be used to describe the same. It will nonetheless be understood that no limitation of the scope of the disclosure is intended by the illustration and description of certain embodiments of the disclosure. In addition, any alterations and/or modifications of the illustrated and/or described embodiment(s) are contemplated as being within the scope of the present disclosure. Further, any other applications of the principles of the disclosure, as illustrated and/or described herein, as would normally occur to one skilled in the art to which the disclosure pertains, are contemplated as being within the scope of the present disclosure.

Referring to the drawings, and in particular FIG. 1, some aspects of a non-limiting example of an engine 10 in accordance with an embodiment of the present disclosure is schematically depicted. In one form, engine 10 is a gas turbine engine. Engine 10 includes a compressor system 12, a combustion system 14 in fluid communication with compressor system 12, and a turbine system 16 in fluid communication with combustion system 14. In one form, compressor system 12, combustion system 14 and turbine system 16 are disposed about an engine centerline 18, e.g., the axis of rotation of compressor 12 and turbine 16. In other embodiments, other arrangements may be employed. In various embodiments, engine 10 may or may not have a compressor system and/or a turbine system, or may have additional turbomachinery components in addition to a compressor system and/or a turbine system. In some embodiments, engine 10 may be a direct propulsion engine that produces thrust directly from combustion system 14, e.g., wherein engine 10 may not include a turbine system 16. In other embodiments, combustion system 14 may form a gas generator for a gas turbine propulsion system, or may be employed in a gas turbine engine topping cycle. In still other embodiments, engine 10 may be one or more of other types of engines that may employ combustion systems such as combustion system 14, such as, for example, a rocket engine. In yet still other embodiments, combustion system 14 may be configured as a direct propulsion engine, and may not include a compressor, e.g., except for engine starting purposes.

Figure 2:
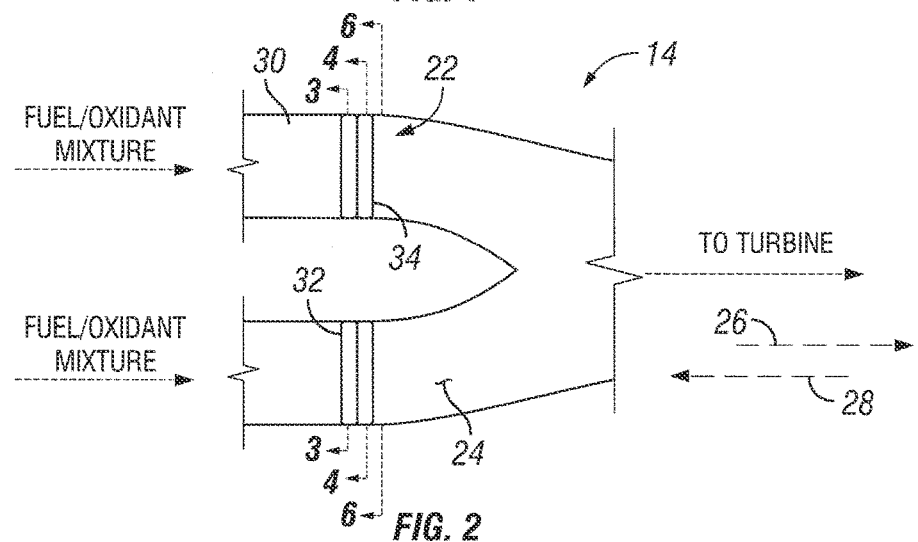
FIG. 2 schematically depicts some aspects of a non-limiting example of a combustion system in accordance with an embodiment of the present disclosure.

Referring to FIG. 2 in conjunction with FIG. 1, some aspects of a non-limiting example of combustion system 14 in accordance with an embodiment of the present disclosure are described. In one form, combustion system 14 is a pressure-gain combustion system. In other embodiments, combustion system 14 may not be a pressure-gain combustion system. In one form, combustion system 14 is a continuous detonation combustion system. In other embodiments, combustion system 14 may not be a continuous detonation combustion system.

Combustion system 14 includes a supply portion 20, a fluid diode 22 and a combustion chamber 24. In one form supply portion 20 is configured to supply a fuel/oxidant mixture to fluid diode 22. The fuel/oxidant mixture is supplied from supply portion 20 to fluid diode 22 generally in a primary flow direction 26. In other embodiments, supply portion 20 may be configured to supply only a fuel or only an oxidant to fluid diode 22. Combustion takes place in combustion chamber 24 on the opposite side of fluid diode 22 from supply portion 20. In one form, combustion chamber 24 is a walled annular chamber. In other embodiments, combustion chamber 24 may take other forms.

Fluid diode 22 is configured to allow a fluid flow in primary flow direction 26 to supply the fluid flow into combustion chamber 24 for use by the combustion process(es) taking place in combustion chamber 24. In one form, the fluid flow is a fuel/oxidant mixture flow. In other embodiments, the fluid flow may be a fuel flow only, e.g., a gaseous and/or vaporous fuel flow, without an oxidant added thereto. In still other embodiments, the fluid flow may be an oxidant flow only, without a fuel added thereto. Fluid diode 22 is configured to prevent or reduce fluid flow in a back-flow direction 28 opposite to primary flow direction 26 at the location(s) of the combustion process(es). In one form, the fuel is a conventional fuel typically employed in gas turbine engines. In other embodiments, one or more other fuel types may be employed in addition to or in place of conventional gas turbine engine fuel. In one form, the oxidant is air. In other embodiments, one or more other oxidants may be employed in addition to or in place of air.

In one form, fluid diode 22 is disposed in an annulus 30 downstream of compressor 12. In other embodiments, fluid diode 22 may be disposed at other locations. In one form, fluid diode 22 includes a diode structure 32 and a diode structure 34 positioned adjacent to diode structure 32. In other embodiments, more than two diode structures e.g., akin to diode structure 32 and diode structure 34, may be employed. In one form, diode structure 32 is positioned immediately adjacent to diode structure 34, e.g., with a small gap between diode structure 32 and diode structure 34 to limit contact between diode structure 32 and diode structure 34. The size of the gap may vary with the needs of the application. In other embodiments, diode structure 32 may be spaced apart from diode structure 34 by some larger amount. In some embodiments, e.g., embodiments employing low friction materials, diode structure 32 and diode structure 34 may be positioned to allow contact therebetween, thereby eliminating or reducing any gap therebetween.

Figure 3:
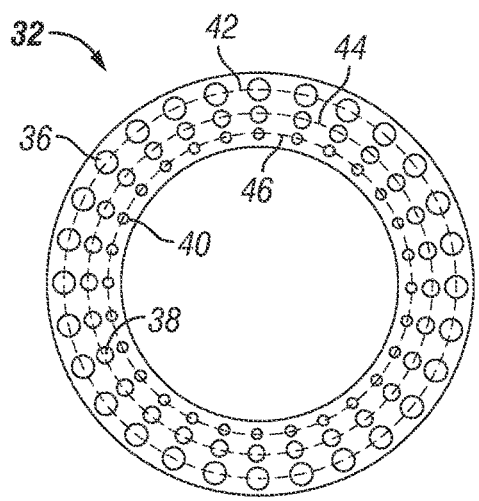
FIGS. 3-5 schematically depict some aspects of a non-limiting example of a fluid diode in accordance with an embodiment of the present disclosure.
Figure 4:
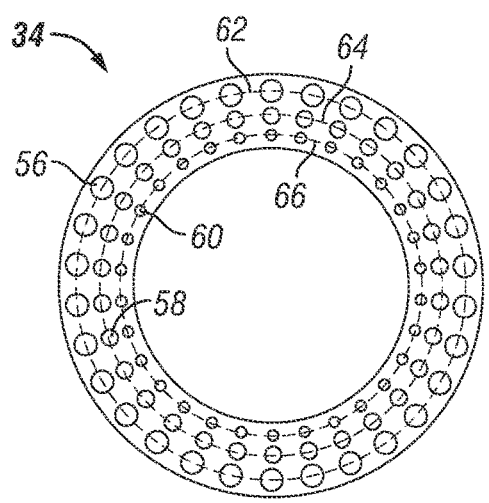
Figure 5:
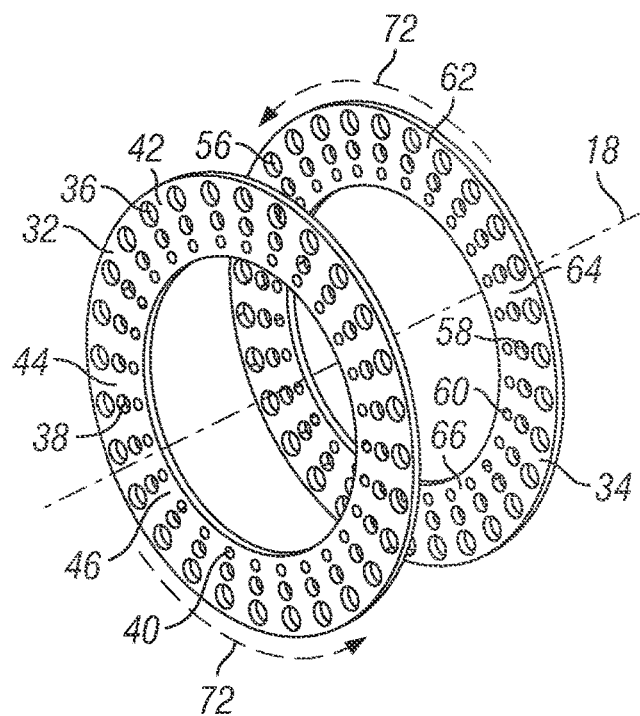

Referring to FIGS. 3-5, some aspects of non-limiting examples of diode structure 32 and diode structure 34 in accordance with an embodiment of the present disclosure are described. In one form, diode structure 32 and diode structure 34 are rings or disks disposed in annulus 30. In other embodiments, one or both diode structures 32 and 34 may take other forms, and may be, for example, cylinders, conical structures or may have any shape defined as a body of revolution. In still other embodiments, diode structures 32 and 34 may take any shape, and may or may not be disposed in an annulus. In one form, diode structures 32 and 34 are formed of a metal alloy, e.g., such as the types of alloys employed in the manufacture of turbine disks. In other embodiments, diode structures 32 and 34 may be formed of one or more other materials, e.g., one or more composite materials and/or a matrix composite materials in addition to or in place of a metal or metal alloy.

Diode structures 32 and 34 include a plurality of fluid flow passages interspersed with a plurality of fluid flow blockages. In the example illustrated in FIG. 3, diode structure 32 includes three (3) circumferential rows of fluid flow passages 36, 38 and 40 interspersed with three circumferential rows of fluid flow blockages 42, 44 and 46. In other embodiments, any number and orientation of rows of fluid flow passages and fluid flow blockages may be employed. In one form, fluid flow passages 36, 38 and 40 are equally spaced circumferentially around diode structure 32, and fluid flow blockages 42, 44 and 46 are equally spaced circumferentially around diode structure 32. In other embodiments, the fluid flow passages and/or the fluid flow blockages may not be equally spaced.

Fluid flow passages 36, 38 and 40 are configured to permit fluid flow through diode structure 32 at the locations of fluid flow passages 36, 38 and 40, e.g., in primary flow direction 26. Fluid flow blockages 42, 44 and 46 are configured to prevent flow through diode structure 32 at the locations of fluid flow blockages 42, 44 and 46. In one form, fluid flow passages 36, 38 and 40 are in the form of circular holes in diode structure 32, whereas the fluid flow blockages 42, 44 and 46 are in the form of the physical material of diode structure 32 that extends circumferentially between respective fluid flow passages 36, 38 and 40. In other embodiments, the fluid flow passages and the fluid flow blockages may take other geometric forms or shapes, e.g., depending upon the needs of the particular application. For example, some embodiments may include fluid flow blockages in the form of spokes of a diode structure in the form of a spoked rotor, whereas the fluid flow passages of such an embodiment may be the spaces between the spokes.

In some embodiments, the fluid flow passages may be configured for a greater pressure drop in one direction than the opposite, e.g., for a greater pressure drop in back-flow direction 28 than in primary flow direction 26. For example, entrance and exit effects, such as rounded and sharp corners, may be formed on appropriate ends of the fluid flow passages to yield a higher pressure drop in back-flow direction 28 than in primary flow direction 26. In addition, the shape of the fluid flow passages may be otherwise configured to yield a higher pressure drop in back-flow direction 28 than in primary flow direction 26, e.g., such as having or including a conical shape and/or hemispherical or partial hemispherical shape and/or any other desired shape that yields a higher pressure drop in back-flow direction 28 than in primary flow direction 26. In various embodiments, the fluid flow passages may be angled, e.g., may have centerlines that are not parallel to the axis of rotation of the diode structure in which the fluid flow passages are formed, which in the depicted embodiment is engine centerline 18, e.g., in order to reduce losses in the fluid flow passing through diode 22 in primary flow direction 26. Also, in some embodiments, the fluid flow passages may have other shapes or features configured to enhance flow through fluid diode 22 in primary flow direction 26 and/or inhibit flow through fluid diode 22 in back-flow direction 28. Further, in some embodiments, fluid flow passages 36, 38 and 40 may take the form of passages that extend in more than one dimension, e.g., having centerlines that extend in two (2) and/or three (3) directions; and/or may vary in direction through diode structure 32 as needed for the particular application.

In the example illustrated in FIG. 4, diode structure 34 includes three (3) circumferential rows of fluid flow passages 56, 58 and 60 interspersed with three circumferential rows of fluid flow blockages 62, 64 and 66. In other embodiments, any number and orientation of rows of fluid flow passages and fluid flow blockages may be employed. In one form, fluid flow passages 56, 58 and 60 are equally spaced circumferentially around diode structure 34, and fluid flow blockages 62, 64 and 66 are equally spaced circumferentially around diode structure 34. In other embodiments, the fluid flow passages and/or the fluid flow blockages may not be equally spaced. Fluid flow passages 56, 58 and 60 are configured to permit fluid flow through diode structure 34 at the locations of fluid flow passages 56, 58 and 60, e.g., in primary flow direction 26. Fluid flow blockages 62, 64 and 66 are configured to prevent flow through diode structure 34 at the locations of fluid flow blockages 62, 64 and 66.

In one form, fluid flow passages 56, 58 and 60 are in the form of circular holes in diode structure 34, whereas the fluid flow blockages 62, 64 and 66 are in the form of the physical material of diode structure 34 that extends circumferentially between respective fluid flow passages 56, 58 and 60. In other embodiments, the fluid flow passages and the fluid flow blockages may take other geometric forms or shapes, e.g., depending upon the needs of the particular application. For example, some embodiments may include fluid flow blockages in the form of spokes of a diode structure in the form of a spoked rotor, whereas the fluid flow passages of such an embodiment may be the spaces between spokes of the rotor.

In some embodiments, the fluid flow passages may be configured for a greater pressure drop in one direction than the opposite, e.g., for a greater pressure drop in back-flow direction 28 than in primary flow direction 26. For example, entrance and exit effects, such as rounded and sharp corners, may be formed on appropriate ends of the fluid flow passages to yield a higher pressure drop in back-flow direction 28 than in primary flow direction 26. In addition, the shape of the fluid flow passages may be otherwise configured to yield a higher pressure drop in back-flow direction 28 than in primary flow direction 26, e.g., such as having or including a conical shape and/or hemispherical or partial hemispherical shape and/or any other desired shape that yields a higher pressure drop in back-flow direction 28 than in primary flow direction 26. In various embodiments, the fluid flow passages may be angled, e.g., may have centerlines that are not parallel to the axis of rotation of the diode structure in which the fluid flow passages are formed, which in the depicted embodiment is engine centerline 18, e.g., in order to reduce losses in the fluid flow passing through diode 22 in primary flow direction 26. Also, in some embodiments, the fluid flow passages may have other shapes or features configured to enhance flow through fluid diode 22 in primary flow direction 26 and/or inhibit flow through fluid diode 22 in back-flow direction 28. Further, in some embodiments, fluid flow passages 56, 58 and 60 may take the form of passages that extend in more than one dimension, e.g., having centerlines that extend in two (2) and/or three (3) directions; and/or may vary in direction through diode structure 34 as needed for the particular application.

Diode structures 32 and 34 are configured for relative motion between each other, e.g., via a drive mechanism (not shown). In one form, the motion between diode structures 32 and 34 is a rotating motion, e.g., about engine centerline 18. In other embodiments, other forms of motion may be employed in addition to or in place of rotation, e.g., including translation in one or more directions and oscillatory motion in one or more directions. In addition, the rotating motion or rotation motion component may be about an axis other than engine centerline 18. In one form, both diode structures 32 and 34 are in motion during the operation of combustion system 14, e.g., rotational motion. In other embodiments, only one of diode structures 32 and 34 may be in motion. In embodiments having more than two diode structures, at least one of the diode structures is in motion during the operation of combustion system 14. In some embodiments having more than two diode structures, more than one or all of the diode structures may be in motion during the operation of combustion system 14. In one form, both diode structures 32 and 34 rotate in the same direction. In other embodiments, diode structures 32 and 34 may rotate in opposite directions.

Diode structures 32 and 34 rotate at different speeds, yielding relative motion between them. In addition, the number of fluid flow passages 36, 38 and 40 per circumferential row, respectively, and the number of fluid flow passages 56, 58 and 60 per circumferential row, respectively, are different, and hence, the number of fluid flow blockages 42, 44 and 46 per row and the number of fluid flow blockages 62, 64 and 66 per row are also different. The relative motion between diode structures 32 and 34, in conjunction with the number and spacing of fluid flow passages and fluid flow blockages, yields moving regions of relative alignment and misalignment of fluid flow passages 36, 38 and 40 in diode structure 32 with corresponding fluid flow passages 56, 58 and 60 in diode structure 34. In one form, the regions of alignment and misalignment rotate around fluid diode 22, e.g., about engine centerline 18 in the depicted embodiment. The rotating regions of relative alignment and misalignment rotate at a different speed than the rotational speed of either diode structure 32 or diode structure 34. In particular, the rotating regions of relative alignment and misalignment rotate substantially faster than diode structures 32 and 34. The rotational speed of the regions of alignment and misalignment are dependent various factors, which in the present embodiment include the number of fluid flow passages (and corresponding fluid flow blockages) in each of diode structures 32 and 34, and the rotational speed of each of diode structures 32 and 34. In other embodiments, other factors may be involved determining the speed of rotation and/or other type of motion of regions of alignment and misalignment, e.g., depending upon the type or types of relative motion that takes place between the diode structures. The regions of relative misalignment of the fluid flow passages (relative alignment of fluid flow blockages with fluid flow passages) are employed to block one or more rotating continuous detonation waves, i.e., to reduce or prevent flow in back-flow direction 28 in the vicinity of the rotating continuous detonation wave(s). The regions of relative alignment of the fluid flow passages (with corresponding relative alignment of fluid flow blockages) are employed to allow fluid flow through fluid diode 22 in primary flow direction 26 at locations spaced apart, e.g., circumferentially, in the depicted embodiment, from the rotating continuous detonation wave(s).

Figure 6:
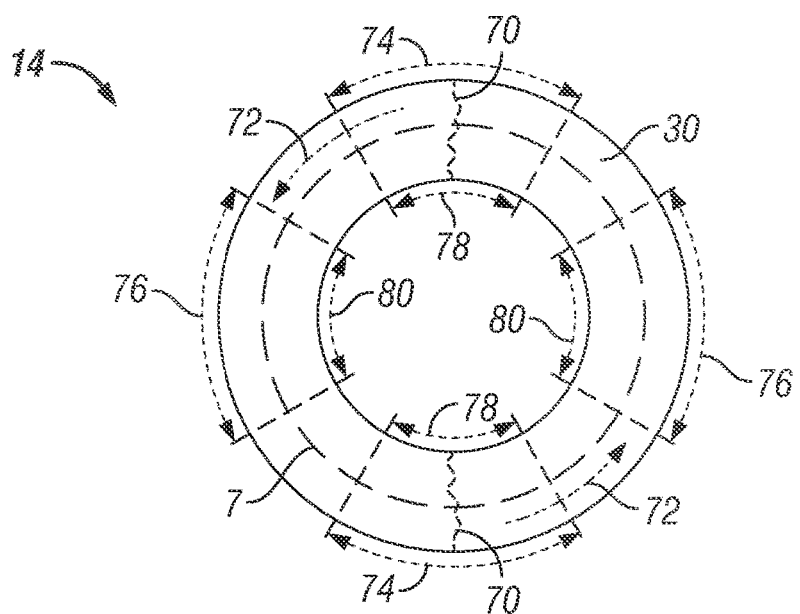
FIG. 6 schematically depicts some aspects of a non-limiting example of a combustion system in accordance with an embodiment of the present disclosure.

For example, referring also to FIG. 6, some aspects of a non-limiting example of combustion system 14 in accordance with an embodiment of the present disclosure are described. During operation, combustion system 14 includes a plurality of rotating continuous detonation waves 70. In the depicted embodiment, two rotating continuous detonation waves 70 are formed. Other embodiments may employ a single rotating continuous combustion wave or a plurality of rotating combustion waves greater in number than two. Rotating continuous detonation waves 70 are referred to as "rotating" because they rotate around annulus 30, e.g., rotating or spinning about engine centerline 18 in a generally circumferential direction 72. Rotating continuous detonation waves 70 are referred to as "continuous" because they are continuous combustion processes, as opposed pulsed combustion processes, such as those exhibited by pulse detonation systems. Rotating continuous detonation waves 70 are referred to as "detonation" waves because they have flame fronts that progress at speeds associated with detonation combustion, as opposed to the lower speeds associated with deflagration combustion. For instance, in one example, detonation waves 70 move at approximately 6,000 linear feet per second. In other embodiments, detonation waves 70 may move at other speeds associated with detonation combustion.

Fluid diode 22 is configured to permit and restrict flow through various portions thereof, e.g., as discussed herein. For example, in one form, fluid diode 22 is configured to form rotating regions 74 and rotating regions 76. Rotating regions 76 are interspersed between rotating regions 74. Rotating regions 74 correspond to areas of relative misalignment of a subset of the fluid flow passages of diode structure 32 with a subset of the fluid flow passages of diode structure 34 (relative alignment of a subset of the fluid flow passages of diode structure 32 with a subset of the fluid flow blockages of diode structure 34, and relative alignment of a subset of the fluid flow passages of diode structure 34 with a subset of the fluid flow blockages of diode structure 32). Rotating regions 76 correspond to areas of relative alignment of a subset of the fluid flow passages of diode structure 32 with a subset of the fluid flow passages of diode structure 34 (relative alignment of a subset of the fluid flow blockages of diode structure 32 with a subset of the fluid flow blockages of diode structure 34). Some embodiments may employ only a single region 74 and a single region 76. The quantities of regions 74 and 76 may vary with the needs of the application.

Fluid diode 22 is configured to rotate rotating regions 74 and 76 at the same speed as rotating continuous detonation waves 70, wherein rotating region 74 is positioned and remains adjacent to rotating continuous detonation waves 70, and wherein rotating regions 76 are disposed between, e.g., circumferentially, rotating continuous detonation waves 70. Rotating regions 74 have, on average, a flow area that is less than the flow area of rotating regions 76. In one form, rotating regions 74 include the smallest regional flow area through fluid diode 22, whereas rotating regions 76 include the largest regional flow area through fluid diode 22. In some embodiments, the flow area through some or all of regions 74 may be zero or nearly so.

Rotating continuous combustion waves 70 form rotating higher pressure zones 78 in the vicinity of the flame fronts. Higher pressure zones 78 have a higher pressure than that of the fuel/oxidant supply mixture. Lower pressure zones 80 are formed between rotating continuous detonation waves 70. The pressure in combustion chamber 24 decreases with increasing distance from the combustion wave fronts of rotating continuous combustion waves 70. Because rotation regions 74 are positioned adjacent to rotating continuous detonation waves 70, higher pressure zones 78 are generally in the same locations as rotating regions 74. Similarly, lower pressure zones 80 are generally in the same locations as rotating regions 76, which are spaced apart from the higher pressures associated with detonation waves 70. The pressure in lower pressure zones 80 between rotating continuous combustion waves 70 is less than the supply pressure of the fuel/oxidant mixture. That is, the supply pressure of the fuel/oxidant mixture is selected to be higher than the pressure in pressure zones 80.

By positioning regions 74 adjacent to rotating continuous detonation waves 70, back-flow resulting from the higher pressure zones 78 associated with the detonation combustion waves is reduced or eliminated. By positioning regions 76 in lower pressure zones 80 away from rotating continuous detonation waves 70, where the fuel/oxidant supply pressure is higher than the pressure in lower pressure zones 80, flow into combustion chamber 24 is permitted. Thus, in various embodiments, one or more portions of fluid diode 22 may restrict or prevent flow in back-flow direction 28, while at the same time one or more other portions of fluid diode 22 permit flow through to combustion chamber 24 in primary flow direction 26, e.g., depending upon circumferential location in a moving reference frame associated with rotating continuous detonation waves 70 and regions 74 and 76. The fuel/oxidant mixture admitted into combustion chamber 24 is combusted upon the approach of the next rotating continuous detonation waves 70 to arrive at the location of the admitted fuel/oxidant mixture, thus continuing the detonation process.

Figure 7:
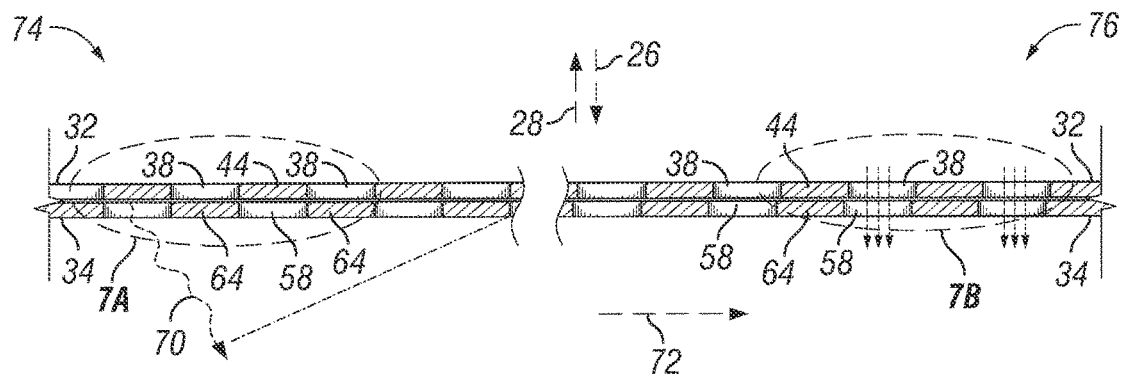
FIGS. 7, 7A and 7B schematically depict some aspects of a non-limiting example of a fluid diode in accordance with an embodiment of the present disclosure.
Figure 7A:
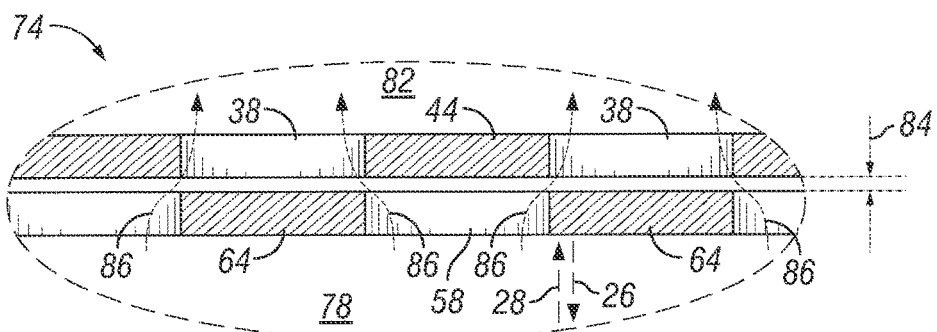
Figure 7B:
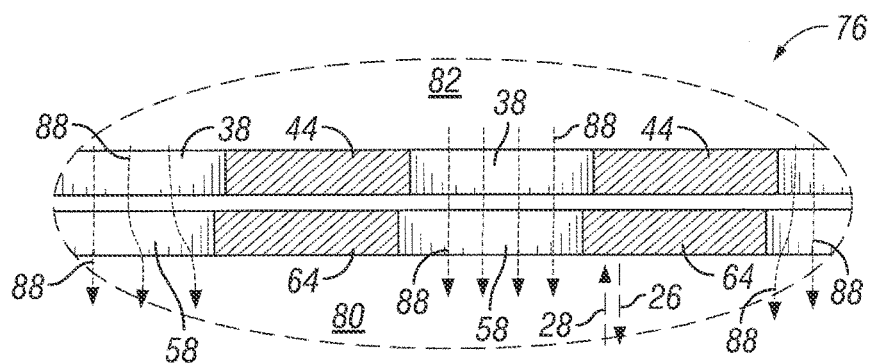

Referring now to FIGS. 7, 7A and 7B, some aspects of a non-limiting example of fluid diode 22 in accordance with an embodiment of the present disclosure are schematically depicted. FIGS. 7, 7A and 7B represent developed sectional views taken circumferentially from the indicated dashed circular line of FIG. 6, illustrating portions of rotating regions 74 (FIG. 7A) and 76 (FIG. 7B) at the middle rows of the fluid flow passages and the fluid flow blockages of diode structures 32 and 34. A rotating continuous detonation wave 70 is illustrated as proceeding in circumferential direction 72. Adjacent to diode structure 32 is the fuel/oxidant mixture 82 that is supplied at pressure to fluid diode 22. The fuel/oxidant pressure may vary with the needs of the application.

At regions 74, wherein fluid diode 22 is exposed to the higher pressure zones 78 in the vicinity of detonation waves 70, which are at a higher pressure than the fuel/oxidant 82 supply pressure, the relative misalignment of fluid flow passages 38 of diode structure 32 with fluid flow passages 58 of diode structure 32 prevents or reduces the back-flow of gases and combustion products from the combustion detonation waves 70 through regions 74. Some back-flow may occur due to a gap 84 between diode structures 32 and 34, indicated by arrows 86. Some back-flow may also occur at locations where there is not a complete overlap of the fluid flow passages with the fluid flow blockages. Some embodiments may provide complete overlap of fluid flow passages with fluid flow blockages at one or more locations, whereas other embodiments may not. Thus, in some embodiments, little or no back-flow may be realized, e.g., at locations of complete overlap and where gap 84 is small or non-existent, whereas in other embodiments, some greater, although acceptable, amount of back-flow may occur. In one form, the degree of misalignment of fluid flow passages of diode structure 32 and diode structure 34 varies from a maximum at the center of regions 74 to a minimum at the designated boundaries of regions 74. In other embodiments, the degree of misalignment may be constant or may vary in one or more other directions, e.g., depending upon the numbers and sizes of the fluid flow passages and fluid flow blockages on diode structures 32 and 34, and the type or types of relative motion between diode structures 32 and 34.

At regions 76, wherein fluid diode 22 is exposed to the lower pressure zones 80 between detonation waves 70, which are at a lower pressure than the fuel/oxidant 82 supply pressure, the relative alignment of fluid flow passages 38 of diode structure 32 with fluid flow passages 58 of diode structure 32 allows fuel/oxidant mixture 82 to flow through regions 76 in primary direction 26 through diode 22 and into combustion chamber 24. The fuel/oxidant 82 flow is indicated in FIG. 7B with arrows 88. In one form, the degree of alignment between fluid flow passages of diode structure 32 and diode structure 34 varies from a maximum at the center of regions 76 to a minimum at the designated boundaries of regions 76. In other embodiments, the degree of alignment may be constant or may vary in one or more other directions, e.g., depending upon the numbers and sizes of the fluid flow passages and fluid flow blockages on diode structures 32 and 34, and the type or types of relative motion between diode structures 32 and 34.

Although rotating regions 74 and 76 rotate at a speed to match the speed of rotation of rotating continuous detonation waves 70 through annulus 30, e.g., 6,000 linear feet per second, e.g., at the radially outermost portion of detonation waves 70, neither of diode structure 32 and 34 rotate at such a speed. Rather the number and spacing of fluid flow passages and the relative rotation rate between diode structure 32 and diode structure 34 form the rotating regions with a higher rate of rotation than either of diode structure 32 and diode structure 34, akin to the operation of a vernier scale, wherein regions of alignment and misalignment of two different scales traverse a greater distance than the distance traversed by one or both of the scales.

The number of fluid flow passages per row for each of diode structures 32 and 34 and the speed of rotation of diode structures 32 and 34 may be determined by various means, e.g., depending upon the configuration of the fluid diode. One way of making such a determination is via Equation 1, below:

$$\frac{N_1}{N_2} = \frac{\omega - \omega_2}{\omega - \omega_1} \quad \text{(Equation 1)}$$

Wherein, $N_1$ is the number of holes per row of diode structure 32; $N_2$ is the number of fluid passages per row of diode structure 34; $\omega$ is the rotational speed of rotating continuous detonation waves 70; $\omega_1$ is the rotational speed of diode structure 32, and $\omega_2$ is the rotational speed of diode structure 34. The rotational speeds and number of fluid passages may be readily determined using Equation 1. In the present example, $N_1$ is 28, $N_2$ is 30, $\omega_1$ is $2\omega/7$ and $\omega_2$ is $\omega/3$, which is one of many potential solutions to Equation 1. Thus, in the depicted example, diode structure 32 rotates at one third of the rotation rate of the rotating continuous detonation waves 70, and diode structure 34 rotates at two-sevenths of the rotation rate of the rotating continuous detonation waves 70. Other embodiments may employ other solutions to Equation 1. In still other embodiments, $N_1$, $N_2$, $\omega_1$ and $\omega_2$ may be determined in one or more other manners. Assuming a tip speed of 6000 feet per second for rotating continuous detonation waves 70, the above solution to Equation 1 yields a tip speed of 2000 feet per second for diode structure 32, and 1714 feet per second for diode structure 34, both of which are within the capabilities of current gas turbine engine high strength metallic alloys and composite or matrix composite materials.

Figure 8:
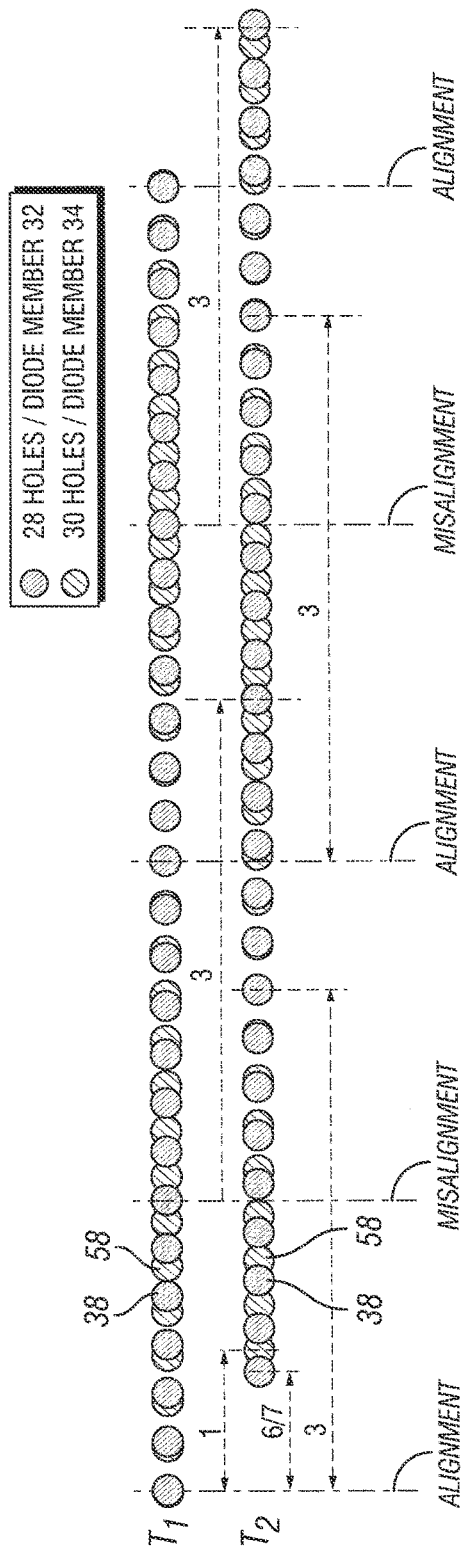
FIG. 8 schematically depicts some aspects of a non-limiting example of a fluid diode in accordance with an embodiment of the present disclosure at two different time periods during operation.

Referring to FIG. 8, some aspects of a non-limiting example of fluid diode 22 in accordance with an embodiment of the present disclosure are schematically illustrated. FIG. 8 is not drawn to scale. FIG. 8 illustrates, in a developed view, the alignment/misalignment of one row of fluid flow passages of diode structure 32 with a corresponding row of fluid passages of diode structure 34 at a time $T_1$, and the alignment/misalignment of the same row of fluid flow passages of diode structure 32 with the same row of fluid flow passages of diode structure 34 at a time $T_2$. In the illustration of FIG. 8, the middle rows of fluid flow passages of diode structures 32 and 34 are shown, that is fluid flow passages 38 of diode structure 32 and fluid flow passages 58 of diode structure 34.

The rotational speed of diode structure 34 is 6/7 of the rotational speed of diode structure 32, since $\omega_1/\omega_2=(2\omega/7)/(\omega/3)=6/7$, as set forth in the above example. As illustrated in FIG. 8, at time $T_1$, fluid flow passages 38 and 58 are aligned at the left end of the view. At time $T_2$, diode structure 32 has moved a unit distance of 1. Since the rotational speed of diode structure 34 is 6/7 of the rotational speed of diode structure 32, at time $T_2$, diode structure 34 has moved 6/7 of a unit distance. However, at time $T_2$, the next alignment of fluid flow passages 38 and 58 occurs 3 units of distance from the initial point of alignment at time $T_1$. Thus, between time $T_1$ and $T_2$, the region of alignment has moved 3 times the distance of diode structure 32, and $3/(6/7)=(21/6)$ times the distance of diode structure 34. As is illustrated in FIG. 8, the regions of misalignment of the fluid flow passages moves in the same manner, that is 3 times the rate of diode structure 32 and (21/6) times the rate of diode structure 34. Accordingly, in the depicted embodiment, regions 74 and 76 rotate around fluid diode 22 in annulus 30 at three times the speed of the fastest spinning diode structure. One or more control systems (not shown) employing one or more sensors, such as position sensors, pressure sensors, vibration sensors, acoustic sensors, temperature sensors and/or other sensors may be used to control the speed and position of diode structures 32 and 34 to ensure that regions 74 are positioned adjacent to detonation waves 70 (i.e., to ensure that regions 74 rotate with and remain at the same circumferential locations as rotating continuous detonation waves 70) in order to present the maximum impediment to back-flow in back-flow direction 28. In some embodiments, diode structures 32 and 34 may be coupled at a fixed ratio, e.g., via one or more gear sets, to ensure, without external control, the relative speed between diode structures 32 and 34. In some embodiments, the relative speed of diode structures 32 and 34 and/or the absolute speed of diode structures 32 and/or 34 may be controlled to vary, e.g., depending on operating conditions, such as based on a measured or calculated speed of detonation waves 70, e.g., under different operating conditions.

Figure 9:
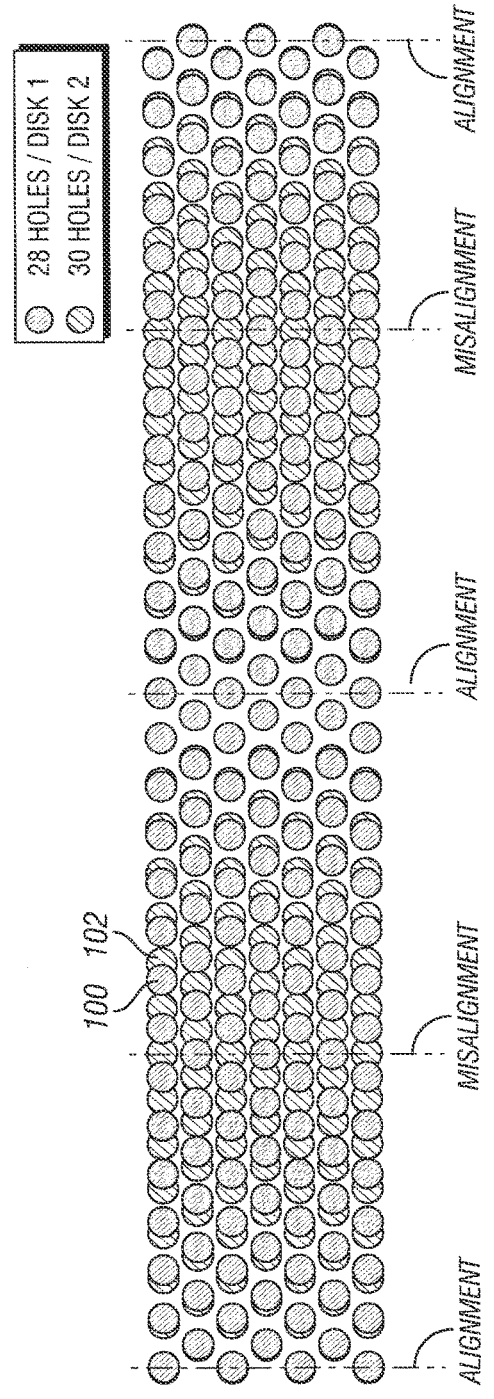
FIG. 9 schematically depicts some aspects of a non-limiting example of a fluid diode in accordance with an embodiment of the present disclosure, illustrating regions of alignment and misalignment.

Referring to FIG. 9, a developed view of another example of diode members in the form of disks is illustrated, each disk having 7 rows of fluid flow passages, e.g., the top rows of which include passages 100 of a disk 1 (28 fluid flow passages 100 per circumferential row of disk 1, interspersed with fluid flow blockages) and passages 102 of a disk 2 (30 fluid flow passages 102 per circumferential row of disk 2, interspersed with fluid flow blockages). FIG. 9 illustrates regions of alignment of fluid flow passages alternating with regions of misalignment of fluid flow passages.

Various embodiments of the present disclosure include a fluid diode that provides one or more regions of reverse flow control that traverse circumferentially (spin) in a typically, but not exclusively, annular shaped region for a continuous detonation combustor. The fluid diode restricts back or reverse flow in one of more moving regions immediately adjacent to the traveling detonation or detonations of a continuous detonation combustor. The fluid diode operates on the principle of two (or more) disks or plates or spoked rotors or other fluid diode elements having sets of holes, slots, or openings through the plate, which move relative to each other. They move at different but related mechanical speeds. The difference in speeds together with the number, spacing and patterns of the openings creates open and closed regions that travel around the annulus or other combustion area shape at a speed greater than either of the disks. Thus the speed of the region of closed area may be made to match the speed of the detonation wave without requiring either of the plates to travel at the speed of the detonation wave. The characteristics can be used to adjust the relative sizes of the open and closed regions by adjusting the elongation of the openings in the direction of travel of these members. The fluid diode works on the principles akin to the vernier scale in which the position of markings in alignment moves a greater distance than the traveling distance of the sliding element. In embodiments of the present disclosure, the position of holes or features in alignment (or greatest misalignment) moves a greater distance than the plates having the holes. It is envisioned that the flow direction through the fluid diode may either be predominately axial or predominately radial, or a combination of both (also with some amount of swirl, in some embodiments). It is also envisioned that the orientation of the plates, disks, or elements may be either flat plate, cylinder, conical or other body of revolution configuration including curved surfaces for any of the types. One of the elements may be stationary. Although rotation is envisioned as the primary method of achieving the intended motion, methods other than rotation or used in combination with rotation are envisioned. Furthermore, the rotation or translation of one or more of the plates relative to each other is envisioned to be either in the same direction or counter in direction to each other.

The performance of a continuous detonation engine or pressure gain combustor was previously held to a low level by employing a high level of flow restriction, resulting in unnecessary pressure loss in the downstream direction required in any diode valve or controlling orifice (aero valve) of previous design. Embodiments of the present disclosure may allow the back-flow region adjacent to the detonation to be sufficiently blocked locally to allow proper combustor and/or engine operation, while also providing a relatively low level of flow restriction (pressure loss) to the fresh incoming fuel, air, or fuel and air mixture (as compared to previous detonation combustion systems). This causes the pressure onto which the detonation adds (that is the pressure into which the detonation travels) to be significantly higher than is previously attainable for a given supply pressure. This higher initial pressure causes a higher post detonation pressure. Thus, this well know limiter of continuous detonation engine performance is mitigated, and combustion systems in accordance with embodiments of the present disclosure may enable a new class of engines (both gas turbine and direct thrust producing) to be developed using this higher pressure gain across the engine or combustor using the constant volume combustion principles of the continuous detonation type.

The low flow loss characteristic of embodiments of the present disclosure in the region or regions of inflow of unburned reactants allows a higher through flow of mass per unit cross sectional area of the device, thus creating a more compact unit, relative to previous detonation combustion systems. In addition, the low flow loss characteristic of embodiments of the present disclosure in the region or regions of inflow of unburned reactants allows the detonation wave which travels into the flow to be oriented in a manner more normal to the direction into which the combusted gas is intended to travel, thus creating a momentum component to the flow more in line with the engine axis. This may increase the performance potential of the combustion system relative to previous combustion systems.

Although it may be possible to employ a moving mechanical blocker traveling at the speed of the detonate wave, such an approach may include tip speeds of approx. 6000 feet per second in the annulus, and is thus undesirable because the resulting stresses in the moving mechanical blocker may be higher than those allowable by known materials under the expected operating conditions. In embodiments of the present disclosure, the regions of translating or rotating high flow restriction and low flow restriction are made to travel at a velocity equal to that of the detonation wave without causing a mechanical component to travel at such high velocities, which would result in high, likely prohibitively high, stress levels in the moving mechanical component. Through the use of embodiments of the present disclosure, it is anticipated that the stresses within the mechanical components may be made to be within those of known design practice using known materials.

In addition, a moving mechanical blocker traveling at the speed of the detonation wave would experience a continuously high heat flux from the detonative combustion wave that it would be blocking. However, embodiments of the present disclosure contemplated herein do not have that continuous high heat flux on any given location of the fluid diode, since at no given location on the structure does the detonation continuously reside. Thus in embodiments of the present disclosure, no location on the structure of the fluid diode is continuously heated by the detonation wave but instead all positions are intermittently heated by the passing detonation wave and then cooled by the arriving flow of unburned reactants traversing through the fluid diode.

The fluid diode may utilize the rotation of the disk or plate on the same or differing axis of rotation to create the intended motion of the single or multiple regions. The relative rotational position of the two or multiple disks or plates or other-shaped fluid diode elements may be indexed (made to have required relative positions) either mechanically or by position control in order to create the desired regions of relatively more open area and relatively more closed area traversing the annulus. Also the fluid diode may utilize the simultaneous translation and rotation of the disks, plates or other shaped diode elements to create the traveling regions of greater fraction of open area and greater fraction of closed area. In this way the fluid diode creates the regions of relatively more open area and relatively more closed area traversing an annulus or other combustion zone shape at velocities sufficient to correspond to the tangential velocity of the traveling or spinning detonation wave(s) in the continuous detonation combustor, while the disks or plates or elements travel at a lower tangential velocity than that of the detonation event or events. The speeds or motion of the disks, plates or other fluid diode elements may be driven by known methods, and may be controlled by sensors detecting the velocity and/or position of the detonation of detonations via known techniques to match either the velocity, position or both of the regions with that of the detonation or detonations. This allows the fluid diode which creates the preferred regions to couple with the spinning detonation in the continuous detonation combustor and to act to restrict the backflow of combusted gasses produced by the detonation in the region adjacent to and trailing the detonation wave or waves.

The fluid diode then carries or reacts the pressure forces generated by the detonation wave and pressure field trailing it via the more closed region having high flow pressure loss characteristics, and thus transmits the reacted forces to the non rotating structure of the combustor by bearings or other known means. The moving more open or less restrictive regions created by the fluid diode are similarly coupled with the inflow of unreacted fuel, air or oxidizer, or un-reacted fuel and air mixture admitted ahead of the spinning detonation and downstream of the fluid diode prior to arrival of the spinning detonation wave which then combusts the mixture. In summary, by this unique means the fluid diode creates single or multiple regions of relatively more open area (less restrictive to fluid flow) and relatively more closed area (more restrictive to fluid flow) that traverse the annulus or other combustion zone shape and couple with the single spinning detonation wave or multiple detonation waves in the continuous detonation combustor.

The fluid diode may be part of a continuous detonation thrust producing engine, a continuous detonation pressure gain combustor, or any other device utilizing continuous detonation traveling in a continuous path. It is intended to include oxidizers other than air in its application.

The spacing of the open areas within the elements is intended to be highly regular and even with deviations from this tolerated by the design. This allows creation of the more open and closed regions to travel at a near constant velocity. It is envisioned that irregular spacing together with an oscillatory component to the various element's speed could be used to create a near constant velocity of the regions.

The distance between open areas in the direction of detonation wave travel is targeted to be near that of the open area or less to give the greatest available open area in the regions of alignment and near alignment of the areas. Lesser spacing is preferred in some embodiments, in that complete blockage of flow in the regions of misalignment of areas is not required. The areas of open flow may be circular, oval, slot, or of other shape consistent with creating a low stress rotating fluid diode elements or set of rotating fluid diode elements. Across the width of the flow channel, the rows of holes may be spaced in an inline or staggered arrangement, with staggered giving a relatively higher percentage of open area in some embodiments.

Referring now to FIGS. 10-25, some aspects of non-limiting examples of embodiments of the present disclosure, which in some respects are built at least in part on the embodiments set forth above, are described.

Throttling of a continuous detonation combustor, such as combustion system 14, also known as a rotating detonation combustor or rotating continuous detonation combustor, may be accomplished by continually introducing a region of dilution air behind the detonative event between the vitiated gases produced by the detonative event, and simultaneously supplying fuel into a region into which the detonative combustion event is moving. This region is caused by the introduction of a transiently moving fuel supply pattern created by application of a valve, similar to that described above as fluid diode 22. It is also envisioned that such a valve may be used to control fuel flow, either together with or separate from the previously invented air valve, fluid diode 22, which acts on the bulk of the combustor flow. The hereinafter described valve application may be employed to control only the addition of dilution air, e.g., by controlling where fuel flow is initiated after the end of the detonative events or continuous detonation waves, and is also envisioned in applications where fuel is introduced in manners set forth above.

The particular application of the valve device, or fluid diode, described below, is to schedule fuel introduction into one or more moving regions immediately adjacent to and behind or ahead of the traveling detonation or detonations, also referred to herein as detonation waves, continuous detonation waves, and rotating continuous detonation waves, of a continuous detonation combustor. The valve operates on the principle of two (or more) diode structures in the form of disks, plates, spoked rotors, cylinders or elements of other shapes having sets of holes, slots or other openings through such diode structures, which move relative to each other. They move at different but closely matched mechanical speeds. The difference in speeds together with the number, spacing and patterns of the openings creates open and closed regions that travel around the annulus at a speed greater than either of the diode structures. Thus the speed of the region of closed area and open area can be made to match the speed of the detonation without requiring either of the plates to travel at the speed of the detonation. The valve works using principles similar to those of the vernier scale, in which the position of markings in alignment moves a greater distance than the traveling distance of the sliding element. In embodiments of the present disclosure, the position of holes or features in alignment (or greatest misalignment) moves a greater distance than the plates having the holes. It is envisioned that the flow direction through the valve may either be predominately axial or predominately radial, or a combination of both (also with some amount of swirl). It is also envisioned that the orientation of the diode structures, e.g., plates, disks, or elements may be for example, flat plate, cylinder, or conical configuration, including curved surfaces for any of the types, and that the diode structures may be in the form of any suitable bodies of revolution. One of the elements may be stationary. Although rotation is envisioned as the primary method of achieving the intended motion, methods other than rotation or used in combination with rotation are envisioned. Furthermore, the rotation and/or translation of one or more of the diode structures relative to each other is envisioned to be either in the same direction or counter in direction relative to each other.

The application of the valve utilizes the opening and closing of the passages to introduce fuel into air, including stratification of charge, to promote detonation and/or to create a non-fueled or very lean layer of fuel/air between sequenced detonations. This also serves to eliminate or reduce deflagrative burning at the interface of combusted and non combusted fuel/air mixture, as commonly occurs in these devices. The valve acts to introduce fuel within the flowpath of the combustor only after some air only (i.e., air without fuel) has been introduced after the detonation wave has passed. When used with the previously described embodiments, this sequence of no or reduced fuel addition occurs or is located after the closed period (e.g., rotating region 74, described above) of the air valve (fluid diode). The net effect of the introduction of the additional or un-fueled air is the lowering of the overall fuel air ratio of the combustor and hence the lower of the bulk mixed exiting temperature of the gases produced by the combustor, and thus acts to provide a throttling feature to a continuous detonation combustor.

Thus, embodiments of the present disclosure include controlling the flow of fuel of a continuous detonation combustor, also known as a rotating detonation combustor, so that the overall fuel/air ratio of the combustor can be reduced significantly below the stoichiometric ratio, thus, in some embodiments, adding a throttling ability, which is not believed by the Inventor to have ever been before identified as possible for a continuous detonation combustor/engine. Also the introduction of a region of low or non-fueled oxidant (e.g., air) region also acts to reduce or eliminate the deflagrative burning that occurs in some continuous detonation combustors, thus improving the pressure gain potential for a given fuel consumption. The allowable fuel/air ratios over which a potential continuous detonation combustor/engine or pressure gain combustor is held to a very restrictive range by the known detonability limits particular to the fuel and air combination and the very near the stoichiometric fuel air ratio. The ability to throttle allows the device to be applicable for use as the main combustor of a gas turbine engine whose turbine inlet temperature is required to be below the level of stoichiometric fuel air ratio, or requires modulation in the power or thrust output level. Some embodiments of the present disclosure allow the fueled region into which the detonation wave continually travels to be within the allowable range for detonation while allowing a portion of air to act as dilution without interfering with the continuous detonation properties. The dilution air is presented as layers within the gas moving downstream of the combustion region and hence mixes with the vitiated gas products due to turbulence. Because it is introduced within a region of relatively low pressure behind the detonation wave, the pressure of supply is below that of the region of pressure gain across the combustor. This dilution air region is acted upon by the shock process created as a result of the detonation in the downstream region and is thereby indirectly compressed by the detonative combustion event, and thus attains the pressure gain state. The density gradient at the interfaces between the hot vitiated products of detonative combustion and the cooler dilution gas, when experiencing the passing motion of the strong pressure gradient from the shock, experiences strong generation of vorticity at the interface due to known baroclinic instabilities. This vorticity created strong mixing at the interfaces also.

The low flow loss characteristic of the above-disclosed fluid diode embodiments allows a low pressure loss method of introduction of this dilution air. The inventor is not aware of any method of throttling of a continuous detonation combustor beyond the narrow range of detonable limits, other than that disclosed and claimed herein.

A moving mechanical feature accomplishing the same functions as the fluid diodes disclosed herein, but traveling at the speed of the detonation wave instead of the reduced speeds of the diode structures disclosed herein that generate moving regions at the speed of the detonation wave, may be considered. However, such a scheme would require tip speeds of approximately 6000 feet per second in the annulus, which would yield stresses that are believed to exceed the capabilities of current state-of-the-art materials. Embodiments of the present disclosure provide the regions of translating (rotating) fueled and un-fueled regions are made to move at a velocity equal to that of the detonation wave, but without causing a structure to travel at such high velocities. Thus, with embodiments of the present disclosure, it is anticipated that the stresses within the structures, e.g. the diode structures, can be made to be within those of known design practice using known materials.

Continuous detonation combustion provides continuously high heat flux from the detonative combustion process. Some embodiments of the present disclosure reduce the average level of high heat flux by introduction of the un-fueled region. All positions are intermittently heated by the passing combustion wave, and are then cooled by the arriving flow of non-vitiated flow traversing the combustor. As described, mixing of the two regions occurs as a consequence of the flow traversing to the combustor exit including known mechanisms of turbulence of various scales. Additional mixing features of various techniques, including known techniques, can be used to further enhance mixing as needed.

Figure 10:
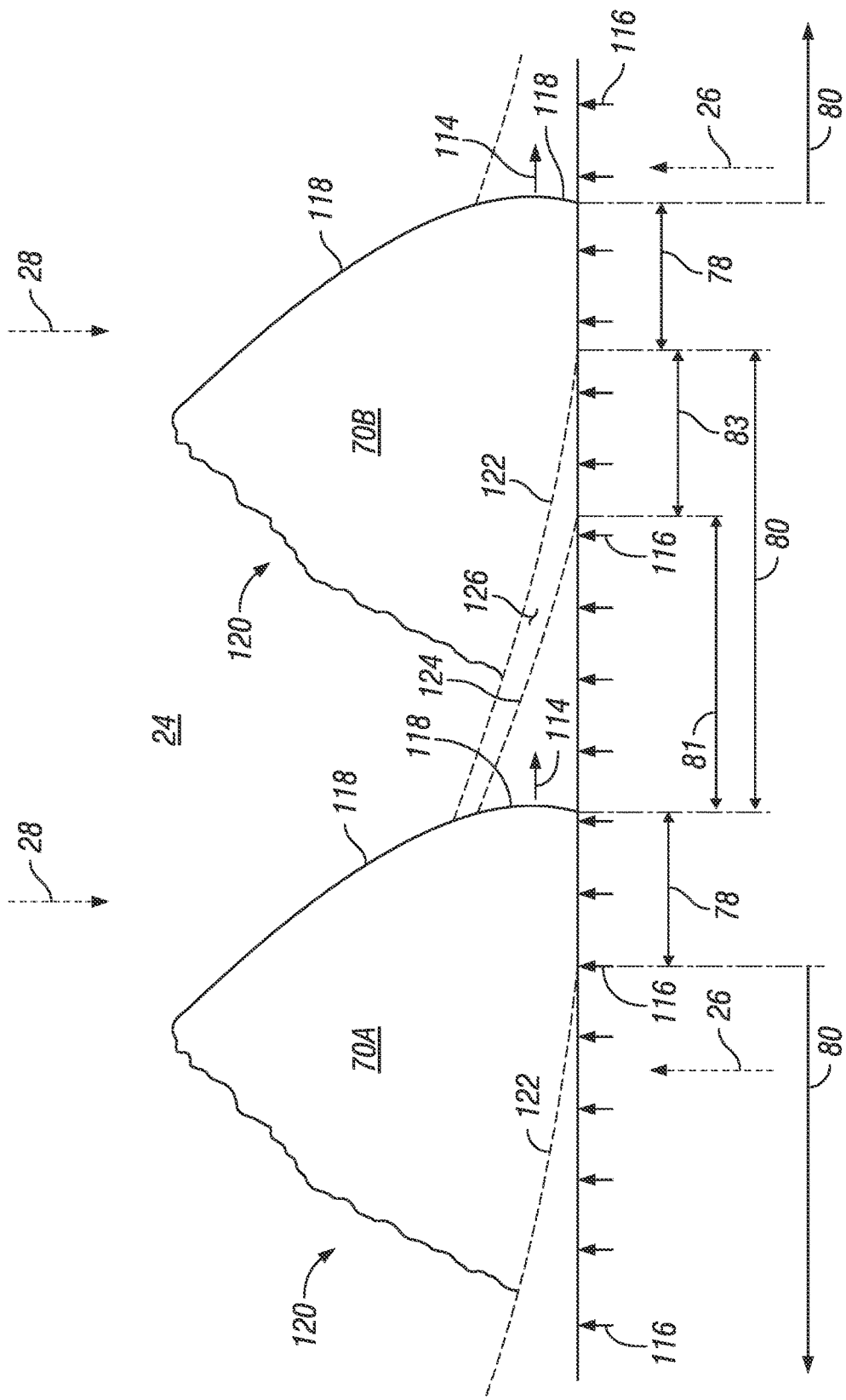
FIG. 10 schematically depicts 2 rotating detonation combustion waves.

Referring to FIG. 10, two rotating continuous detonation waves 70A and 70B are illustrated in a laid-out or developed view. The direction of propagation of the rotating continuous detonation waves is indicated by arrow 114, which corresponds to circumferential direction 72. The direction of provision of fuel and oxidant in the depiction of FIG. 10 is indicated by arrows 116. It will be understood that fuel and/or oxidant may be provided from various directions in various embodiments. Each detonation wave has a flame front 118, otherwise referred to herein as wavefront 118 or leading edge 118, and a trailing or aft end 120. Flame fronts 118 proceed circumferentially around the annular combustion chamber. In the depiction of FIG. 10, fuel and oxidant are provided into combustion chamber 24 via one or more fluid diodes in manner described above, at least insofar as fuel and oxidant are supplied in certain zones, and neither fuel nor oxidant are supplied in other zones. Air is supplied into lower pressure zones 80 via fluid diode 22, as previously described. Fuel is supplied via a fluid diode 23, described below, in a rotating fuel introduction zone 81. Rotating lower pressure zone 80 and fuel introduction zone 81 advance in front of each rotating continuous detonation wave, into which the detonative combustion wavefront 118 moves, detonatively combusting the fuel/oxidant mixture; the fuel and oxidant mixture is continuously supplied in advance of the rotating continuous detonation wave, thereby continuously maintaining the rotating continuous detonation wave. For example, in one embodiment, fluid diode 23 is configured to supply fuel in fuel introduction zone 81, and fluid diode 22 is configured to supply air into lower pressure region 80, e.g., in direction 26, although it will be understood that in various embodiments of the present disclosure, including those illustrated and described herein, fuel and/or oxidant may be supplied in direction 26 and/or other directions, e.g., directions transverse to direction 26. Similarly, as in the manner described above, fluid flow from the rotating continuous detonation waves at higher pressure zones 78 in backflow direction 28 is prevented or reduced via one or more fluid diodes in manner described above. In the depiction of FIG. 10, higher pressure zones 78 and lower pressure zones 80 are depicted as being of different lengths, e.g., circumferential lengths or arc lengths (degrees of arc). It will be understood that FIG. 10 is diagrammatic in nature, and not to scale; and further, that the relative sizes or lengths (circumferential or arc and/or radial) of higher pressure zones 78 and lower pressure zones 80 may vary depending upon the needs of the particular application, e.g., in the manner set forth below, and may or may not be the same size/length. In the description that follows, reference is made to circumferential length, which in most cases is synonymous with arc length, or degrees of arc, and hence is generally referred to simply as circumferential length.

Under certain circumstances, such as operation at stoichiometric fuel/oxidant conditions or near stoichiometric fuel/oxidant conditions, deflagrative combustion may take place at the aft end 120 of each rotating continuous detonation combustion wave in the vicinity of the interface 122 between combusted and non combusted fuel/air mixture, effectively forming a deflagrative zone in the vicinity of the interface 122, which may also thus be referred to as deflagrative zone 122. In order to prevent incoming fuel and oxidant supplied at low pressure zone 80 from generating deflagrative combustion at interface 122, it is desirable to delay the provision of fuel so as to create a dilution layer, e.g., a layer of only air, behind the detonation wave in the vicinity of interface 122. The fuel introduction lag, i.e., wherein the fuel introduction in lower pressure zone 80 lags the air introduction in low pressure zones 80, creates an air/fuel interface 124 that is spaced apart from deflagrative zone or interface 122, forming a dilution air layer or dilution layer 126. Thus, dilution layer 126 is a result of lagging the fuel introduction, which is depicted as fuel lag 83 or fuel introduction lag 83, which is formed or generated in accordance with embodiments of the present disclosure. Accordingly, whereas the embodiments described with respect to FIGS. 1 to 9 introduced fuel and air throughout the lower pressure zone 80, the embodiments described with respect to FIGS. 11-25 lag the fuel introduction relative to the air introduction, and hence, have a reduced fuel introduction region, illustrated in FIG. 10 as fuel introduction zone 81. The air introduction region occurs in lower pressure zones 80, both during the region of fuel introduction lag 83 and during the fuel introduction zone 81. Various embodiments of the present disclosure are configured to generate the fuel introduction lag, some of which are described as follows. In some embodiments, the fuel introduction lag may be varied, and/or the stoichiometry of the detonation waves may be varied, and hence dilution layer 126 and fuel introduction region 81 may be varied, thereby reducing or eliminating deflagrative combustion at or in the vicinity of interface 122, and throttling the output of the continuous detonation combustion system 15.

In the depiction of FIG. 10, detonation wave 70A is considered generally to be a detonation wave with rotating regions 74 and 76, and higher and lower pressure zones 78 and 80, respectively, of the sort produced by or associated with the embodiments of FIGS. 1-9, whereas detonation wave 70B is considered generally to be a detonation wave with rotating regions 75, 77 and 79; and higher and lower pressure zones 78 and 80, respectively; of the sort produced by or associated with the embodiments of FIGS. 11-25. Rotating regions 77 and 79 form fuel introduction zones and zones of fuel introduction lag, referred to herein as fuel introduction zone 81 and fuel introduction lag 83, respectively. In one form, circumferential length of the combination of fuel introduction zone 81 and fuel introduction lag 83 is equal to the circumferential length of lower pressure region 80. In other embodiments, fuel introduction zone 81 and fuel introduction lag 83 may not be equal in circumferential length to that of lower pressure region 80, and may vary, e.g., based on the fuel supply pressure, and the alignment and misalignment of fluid supply passages. Higher pressure zone 78 is illustrated as being at the forward portion of the detonation wave, wherein fuel and oxidant are not supplied, and lower pressure zone 80 trails the higher pressure portion of the detonation wave, and has a sufficiently low pressure relative to the supply pressures of the fuel and oxidant to allow the entry of fuel and oxidant into combustion chamber 24.

Figure 11:
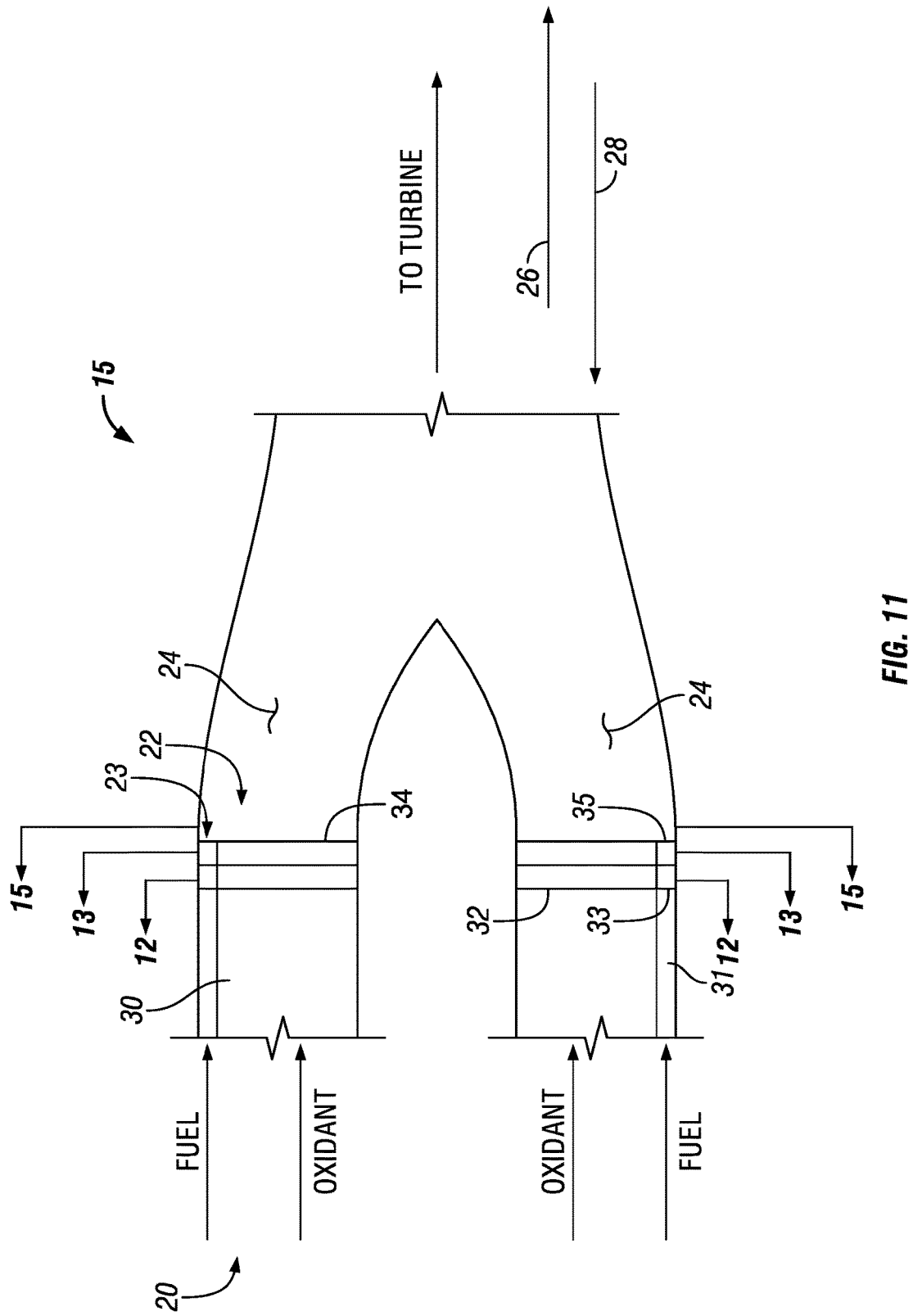
FIG. 11 schematically illustrates some aspects of a non-limiting example of a combustion system in accordance with an embodiment of the present disclosure.

Referring to FIG. 11, some aspects of non-limiting example of a combustion system 15 in accordance with embodiments of the present disclosure are schematically illustrated. In one form, combustion system 15 is a pressure-gain combustion system. In other embodiments, combustion system 15 may not be a pressure-gain combustion system. In one form, combustion system 15 is a continuous detonation combustion system. In other embodiments, combustion system 15 may not be a continuous detonation combustion system. It will be understood that combustion system 15 may be employed in engine 10 of FIG. 1 in addition to or in place of combustion system 14. Moreover, it will be understood that combustion system 15 includes many of the same or similar components as described above with respect to combustion system 14, in which case like reference numbers/characters will be employed in the following description.

Combustion system 15 includes supply portion 20, first fluid diode 22, a second fluid diode 23 and combustion chamber 24. It will be understood that the use of the terms, "first," "second," and the like, when describing components of combustion system 15 are not intended to imply any sequence, order of priority, order of arrangement, order of flow, or the like, but rather, are merely intended to numerically differentiate one such component from another for ease of introduction of such components. In one form supply portion 20 is configured to supply an oxidant to fluid diode 22 and a fuel to fluid diode 23. In one form, the oxidant is air, and the fuel is conventional gas turbine engine fuel. In other embodiments, other oxidants may be used in addition to or in place of air, and/or other fuels may be used in addition to or in place of conventional gas turbine engine fuel. In some other embodiments, supply portion 20 may be configured to supply only a fuel or only an oxidant to fluid diode 22, and to supply only of fuel or only an oxidant to fluid diode 23. In some embodiments, supply portion 20 may be configured to supply a fuel/air mixture to fluid diode 22, and also a fuel/air mixture to fluid diode 23. For example, in some embodiments, it may be desirable to supply a substantially substoichiometric fuel/air mixture to fluid diode 22, and to supply more of fuel/air mixture having higher stoichiometry, e.g. near stoichiometric, to fluid diode 23, wherein the fuel/air mixture supplied to fluid diode 22 is insufficient for combustion, but in conjunction with the fuel/air mixture supplied to fluid diode 23 is sufficient for combustion. The stoichiometry of the final fuel/air mixture may vary with the needs of the application, and may be stoichiometric or substoichiometric with the stoichiometry being sufficient to achieve desired detonation combustion properties.

The fuel and oxidant may be supplied from supply portion 20 to first fluid diode 22 and fluid diode 23 generally in primary flow direction 26, such as is depicted in FIG. 11. In some embodiments, fuel and/or oxidant may be supplied in or from other directions e.g., radially inward. Combustion takes place in combustion chamber 24 on the opposite side of fluid diode 22 and fluid diode 23 from supply portion 20. In one form, combustion chamber 24 is a walled annular chamber. In other embodiments, combustion chamber 24 may take other forms.

First fluid diode 22 is configured, as set forth previously, to allow a fluid flow, such as an oxidant flow, in primary flow direction 26 to supply the fluid flow into combustion chamber 24 for use by the detonative combustion process(es) taking place in combustion chamber 24. In addition, fluid diode 22 is configured, as set forth previously, to prevent or reduce fluid flow in a back-flow direction 28 opposite to primary flow direction 26 at the location(s) of the detonative combustion process(es).

As set forth previously, first fluid diode 22 is disposed in annulus 30 downstream of compressor 12, but in other embodiments may be disposed at other locations. In one form, first fluid diode 22 includes first diode structure 32 or first rotating diode structure 32; and second diode structure 34 or second rotating diode structure 34, each of which may be disposed relative to each other, or otherwise configured or arranged as previously described. In some embodiments, one or more seals may be disposed between diode structure 32 and diode structure 34. In some embodiments, fluid diode 22 may employ one or more additional diode structures of the form previously described as with respect to diode structure 32 and diode structure 34.

Second fluid diode 23 is configured, in the same manner as previously set forth above with respect to fluid diode 22, to allow a fluid flow, such as a fuel flow, in primary flow direction 26 to supply the fluid flow into combustion chamber 24 for use by the detonative combustion process(es) taking place in combustion chamber 24. In addition, fluid diode 23 is configured, in the same manner as previously set forth above with respect to fluid diode 22, to prevent or reduce fluid flow in a back-flow direction 28 opposite to primary flow direction 26 at the location(s) of the detonative combustion process(es). In one form, fluid diode 23 is positioned radially outward of fluid diode 22, and is disposed or otherwise positioned to receive fuel from an annulus portion 31 of annulus 30. In other embodiments, fluid diode 23 maybe arranged differently than that illustrated in FIG. 11. For example, in some embodiments, fluid diode 23 may take the form of a cylinder, a cone or conical section, or any body of revolution.

In one form, fluid diode 23 includes a third diode structure 33 or a third rotating diode structure 33 and a fourth diode structure 35 or fourth rotating diode structure 35 positioned adjacent to diode structure 33. In other embodiments, more than two diode structures e.g., akin to diode structure 33 and diode structure 35, may be employed. In one form, diode structure 33 is positioned immediately adjacent to diode structure 35, e.g., with a small gap between diode structure 33 and diode structure 35 to limit contact between diode structure 33 and diode structure 35. The size of the gap may vary with the needs of the application. In other embodiments, diode structure 33 may be spaced apart from diode structure 35 by some larger amount. In some embodiments, e.g., embodiments employing low friction materials, diode structure 33 and diode structure 35 may be positioned to allow contact therebetween, thereby eliminating or reducing any gap therebetween. In some embodiments, one or more seals may be disposed between diode structure 33 and diode structure 35.

Figure 13:
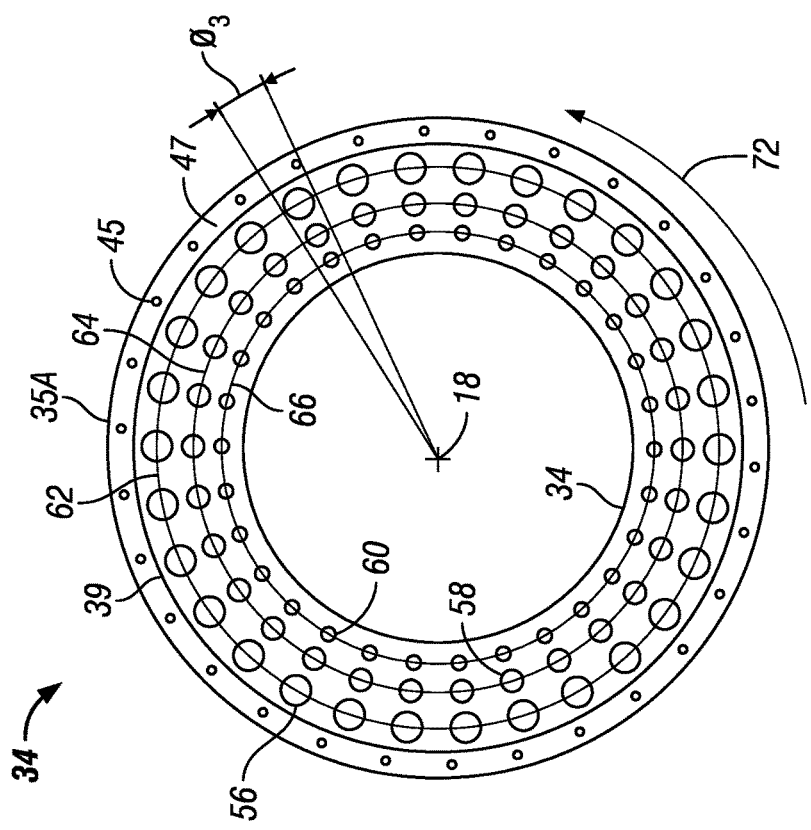
FIG. 13 schematically illustrates some aspects of a non-limiting example of a fluid diode structure in accordance with an embodiment of the present disclosure.
Figure 12:
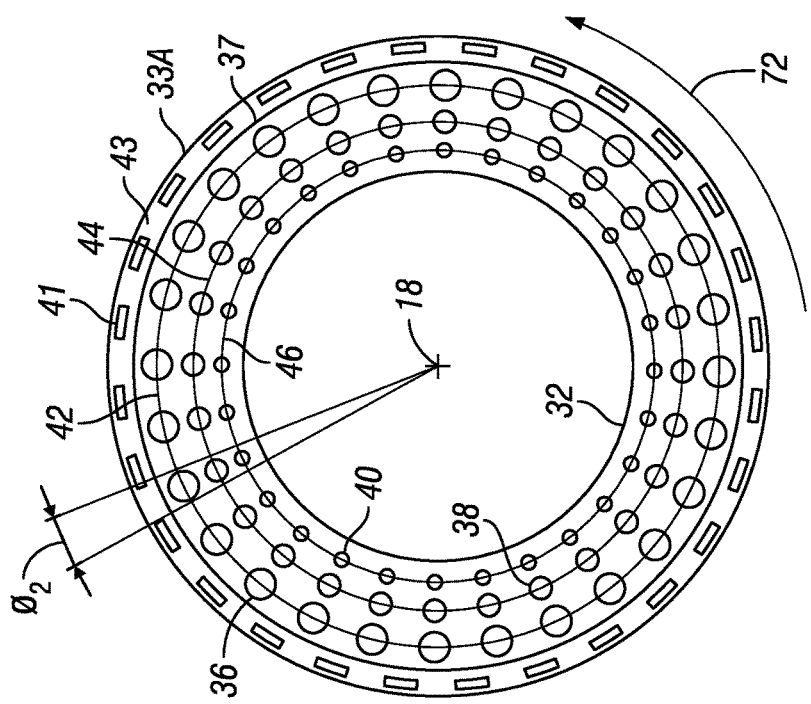
FIG. 12 schematically illustrates some aspects of a non-limiting example of a fluid diode structure in accordance with an embodiment of the present disclosure.
Figure 14:
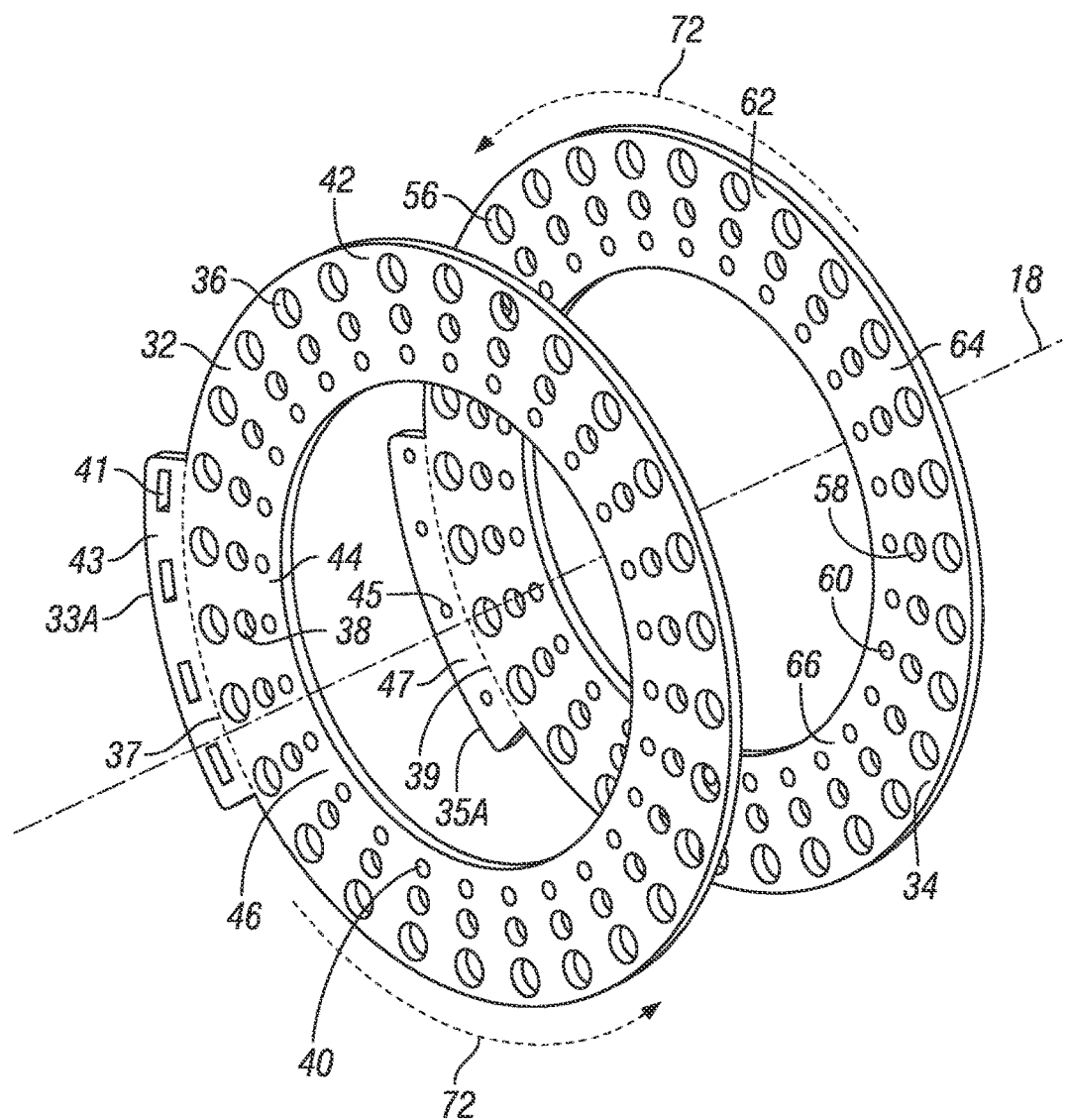
FIG. 14 schematically illustrates some aspects of a non-limiting example of two fluid diode structures in accordance with an embodiment of the present disclosure.

Referring to FIGS. 12-14, some aspects of non-limiting examples of diode structure 33 and diode structure 35 in accordance with an embodiment of the present disclosure are described. In one form, diode structure 33 and diode structure 35 are rings or disks disposed in annulus 30 e.g., referred to as diode structure 33A and diode structure 35A. In other embodiments, one or both diode structures 33 and 35 may take other forms, and may be, for example, cylinders, conical structures or may have any shape defined as a body of revolution. For example, some embodiments described and illustrated herein include diode structure 33B in diode structure 35B in the form of cylindrical structures. However, for the sake of the convenience of the reader, the written description generally refers to the aforementioned fluid flow passages simply as fluid flow passages 33 and 35. In still other embodiments, diode structures 33 and 35 may take any shape, and may or may not be disposed in an annulus. Diode structures 33 and 35 may be formed of the same material described above as with respect to diode structure 32 and 34, or may be formed of any material suited to the temperatures and stresses and other environmental factors associated with a combustion system, such as combustion system 15. In the depictions of FIGS. 12-14, diode structures 33A and 35A are illustrated as extending from diode structures 32 and 34 respectively. Dashed lines 37 and 39 respectively indicate that diode structures 33 and 35 may be formed integrally with or attached to respective diode structures 32 and 34, or may be separate components that rotate in direction 72 at the same speed as, and in maintained orientation relative to diode structures 32 and 34.

Diode structures 33 and 35 include a plurality of fluid flow passages interspersed with a plurality of fluid flow blockages. Diode structures 33 and 35 include fluid flow passages 41 and 45. In some embodiments, fluid flow passages 41 are employed in conjunction with diode structure 32, and fluid flow passages 45 are employed in conjunction with diode structure 34. In such cases, fluid flow passages 41 may be illustrated as fluid flow passages 41A, and fluid flow passages 45 are illustrated as fluid flow passages 45A. In some embodiments, fluid flow passages 41 may be employed in conjunction with diode structure 34, and fluid flow passages 45 may be employed in conjunction with diode structure 32.

In such cases, fluid flow passages 41 are illustrated as fluid flow passages 41B, and fluid flow passages 45 are illustrated as fluid flow passages 45B. However, for the sake of the convenience of the reader, the written description generally refers to the aforementioned fluid flow passages simply as fluid flow passages 41 and 45. Accordingly, in the example illustrated in FIGS. 12-14, diode structure 33 includes a single circumferential row of fluid flow passages 41 interspersed with a single circumferential row of fluid flow blockages 43; and diode structure 35 includes a single circumferential row of fluid flow passages 45 interspersed with a single circumferential row of fluid flow blockages 47. In one form, the number of fluid flow passages 41 is the same as the number of fluid flow passages 36, 38 and 40; and the number of fluid flow blockages 43 is the same as the number of fluid flow blockages 42, 44 and 46. In addition, the number of fluid flow passages 45 is the same as the number of fluid flow passages 56, 58 and 60; and the number of fluid flow blockages 47 is the same as the number of fluid flow blockages 62, 64 and 66. In other embodiments, the number of fluid flow passages 41 and 45, and the number of fluid blockages 43 and 47 may not be the same in number as the corresponding fluid flow passages and fluid flow blockages of diode structures 32 and 34. In various embodiments, any number, circumferential length, size and orientation of rows of fluid flow passages and fluid flow blockages may be employed in accordance with the principles disclosed herein, so as to yield the rotating regions 75, 77, 79, fuel introduction zones 81 and zones of fuel introduction lag 83 disclosed herein. In one form, fluid flow passages 41 and 45 are equally spaced circumferentially, and fluid flow blockages 43 and 47 are equally spaced circumferentially. In other embodiments, the fluid flow passages and/or the fluid flow blockages may not be equally spaced. For the sake of convenience of illustration, only a portion of the circumference of each of diode structures 33 and 35 (diode structures 33A and 35A) is illustrated. It will be understood that diode structures 33 and 35 continue circumferentially around the periphery of diode structures 32 and 34, respectively.

Fluid flow passages 41 and 45 are configured to permit fluid flow through respective diode structures 33 and 35 at the locations of respective fluid flow passages 41 and 45, e.g., in primary flow direction 26. Fluid flow blockages 43 and 47 are configured to prevent flow through respective diode structures 33 and 35 at the locations of fluid flow blockages 43 and 47. In one form, fluid flow passages 41 are in the form of slots, and fluid flow passages 45 are in the form of holes, e.g. circular holes, whereas the fluid flow blockages 43 and 47 are in the form of the physical material of respective diode structures 33 and 35 that extend circumferentially between respective fluid flow passages 41 and 45. In some embodiments, fluid flow passages 41 may be in the form of slots, and fluid flow passages 45 may be in the form of holes. In other embodiments, the fluid flow passages and the fluid flow blockages may take other geometric forms or shapes, e.g., depending upon the needs of the particular application. For example, some embodiments may include fluid flow blockages in the form of spokes of a diode structure in the form of a spoked rotor, whereas the fluid flow passages of such an embodiment may be the spaces between the spokes In some embodiments, the fluid flow passages may be configured for a greater pressure drop in one direction than the opposite, e.g., for a greater pressure drop in back-flow direction 28 than in primary flow direction 26. For example, entrance and exit effects, such as rounded and sharp corners, may be formed on appropriate ends of the fluid flow passages to yield a higher pressure drop in back-flow direction 28 than in primary flow direction 26. In addition, the shape of the fluid flow passages may be otherwise configured to yield a higher pressure drop in back-flow direction 28 than in primary flow direction 26. In various embodiments, the fluid flow passages may be angled, e.g., may have centerlines that are not parallel to the axis of rotation of the diode structure in which the fluid flow passages are formed, which in the depicted embodiment is engine centerline 18, e.g., in order to reduce losses in the fluid flow passing through diode 23 in primary flow direction 26. Also, in some embodiments, the fluid flow passages may have other shapes or features configured to enhance flow through fluid diode 23 in primary flow direction 26 and/or inhibit flow through fluid diode 23 in back-flow direction 28. Additionally, in some embodiments the orientation of the fluid diode structures may be reversed relative to the depicted embodiment, e.g., wherein diode structures 34 and 35 are positioned to be exposed to fuel and/or oxidant prior to diode structures 32 and 33 being exposed to fuel and/or oxidant.

Diode structures 33 and 35 are configured for relative motion between each other in the same manner and variations thereof as described previously as with respect to diode structures 32 and 34. In one form, both diode structures 32 and 34 rotate in the same direction. In other embodiments, diode structures 32 and 34 may rotate in opposite directions. As with diode structures 32 and 34, diode structures 33 and 35 rotate at different speeds, yielding relative motion between them. In addition, the number of fluid flow passages 41 and 45 per circumferential row, and hence, the number of fluid flow blockages 43 and 47 per row are also different. In some embodiments, the fluid flow passages may be configured for a greater pressure drop in one direction than the opposite, e.g., for a greater pressure drop in back-flow direction 28 than in primary flow direction 26, as set forth above with respect to fluid diode 22. The relative motion between diode structures 33 and 35, in conjunction with the number and spacing of fluid flow passages and fluid flow blockages, yields moving regions of relative alignment and misalignment of fluid flow passages 41 in diode structure 33 with corresponding fluid flow passages 45 in diode structure 35. In one form, the regions of alignment and misalignment rotate around fluid diode 23, e.g., about engine centerline 18 in the depicted embodiment. The rotating regions of relative alignment and misalignment rotate at a different speed than the rotational speed of either diode structure 33 or diode structure 35. In particular, the rotating regions of relative alignment and misalignment rotate substantially faster than diode structures 33 and 35, and are configured to rotate at the same speed as the rotating continuous detonation wave in the same manner as that described above with respect to fluid diode 22. The rotational speed of the regions of alignment and misalignment are dependent various factors, which in the present embodiment include the number of fluid flow passages (and corresponding fluid flow blockages) in each of diode structures 33 and 35, and the rotational speed of each of diode structures 33 and 35. In other embodiments, other factors may be involved determining the speed of rotation and/or other type of motion of regions of alignment and misalignment, e.g., depending upon the type or types of relative motion that takes place between the diode structures. The regions of relative misalignment of the fluid flow passages (relative alignment of fluid flow blockages with fluid flow passages) are employed to block one or more rotating continuous detonation waves, i.e., to reduce or prevent flow in back-flow direction 28 in the vicinity of the higher pressure regions rotating continuous detonation wave(s). The regions of relative alignment of the fluid flow passages (with corresponding relative misalignment of fluid flow blockages) are employed to allow fluid flow through fluid diode 23 in primary flow direction 26 and lower pressure regions. The areas of alignment and misalignment are spaced apart circumferentially.

Figure 15:
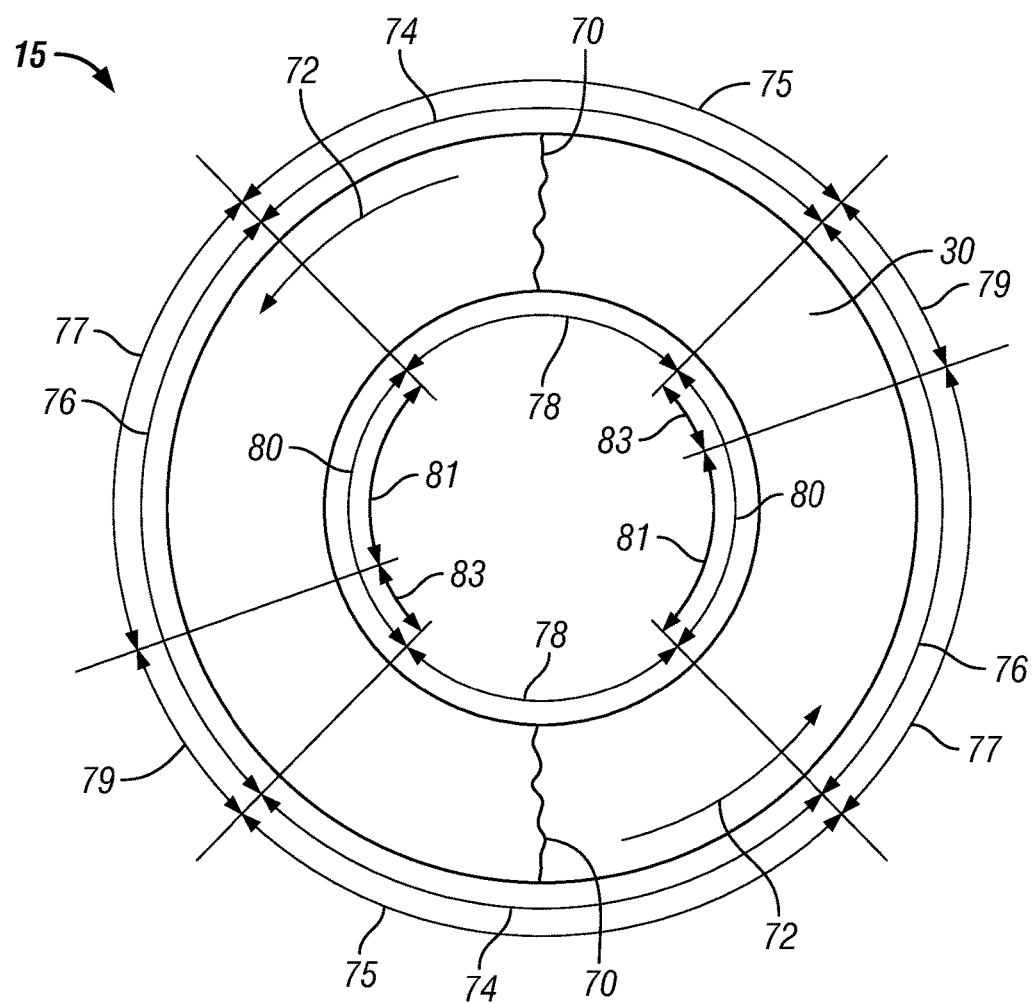
FIG. 15 schematically illustrates some aspects of a non-limiting example of rotating regions and pressure zones generated in accordance with an embodiment of the present disclosure.

Referring to FIG. 15, some aspects of a non-limiting example of rotating regions of alignment of fluid flow passages and rotating regions of misalignment of fluid flow passages, and corresponding and rotating lower pressure regions and higher pressure regions, in accordance with an embodiment of the present disclosure are schematically illustrated. Fluid flow passages 41 and 45 are positioned to lag behind respective fluid flow passages 36, 38, 40 and 56, 58, 60; and hence fluid flow blockages 43 and 47 lag behind respective fluid blockages 42, 44, 46 and 62, 64, 66. For example, in the depiction of FIG. 12, the leading edges of fluid flow passages 41 lag the leading edges of fluid flow passages 36, 38, 40 by an angle Ø2; and the leading edges of fluid flow passages 45 lag the leading edges of fluid flow passages 56, 58, 60 by an angle Ø3. The lag of fluid flow passages 41 and fluid flow passages 45, e.g., the lag of the leading edges and/or the radial centerlines, generate the fuel introduction lag 83 depicted in FIG. 10. In particular, in some embodiments, the circumferential length of the openings 45 relative to the circumferential length of slots 41 forms rotating region 77, which determines the circumferential length of the fuel introduction zone 81, e.g., extending from the left-hand end of the fuel introduction lag 83 depicted in FIG. 10, and extending leftward to the left-hand end of lower pressure zone 80. In addition, in some embodiments, the amount of lag of the fluid flow passages 41 and 45 relative to respective flow passages 36, 38, 40 and 56, 58, 60 forms rotating region 79, which determines the point at which fuel introduction begins, e.g., relative to rotating region 76 and/or lower pressure zone 80, and hence, determines the fuel introduction lag 83. In addition, diode structures 33 and 35 are configured to generate rotating region 75, in a manner the same as or similar to that described above with respect to rotating region 74 and rotating region 76. In the depicted embodiment, rotating region 75 is illustrated as being of the same circumferential length or arc length as rotating region 74. In other embodiments, rotating region 75 may be a different circumferential length or arc length relative to rotating region 74.

In the depiction of FIG. 15, the rotating regions 74 and 76 formed by fluid diode 22 are illustrated as having approximately the same circumferential length. However, it will be understood that fluid diode structures 32 and 34 may be configured to generate a rotating region 74 having a different size than rotating region 76, e.g., by changing the circumferential length of the fluid flow passages in fluid diode structures 32 and 34, which thus changes the circumferential length of the fluid flow blockages. In some embodiments, the circumferential length of the fluid flow passages in one of the diode structures may be changed relative to the circumferential length of the fluid flow passages in the other of the diode structures in order to generate a rotating region 74 having a different circumferential length than rotating region 76. By creating a rotating region 74 having a different circumferential length than rotating region 76, the respective higher pressure zones 78 and lower pressure zones 80 defined by respective rotating regions 74 and 76 will have a different circumferential length in one of the fluid diode structures relative to the other. In addition, the effective circumferential length of the fluid flow passages may be varied on-the-fly, i.e. during the operation of combustion system 14 and/or combustion system 15 by subdividing fluid diode structures 32 and/or 34 into 2 or more rotating components each, wherein one of the rotating components has fluid flow passages having a length in the circumferential direction that is different than the fluid flow passages of the other component, and by varying the relative position e.g. angular position, between the rotating components. Such a configuration is equivalent to having 2 diode structures rotating with each other at the same speed employed in conjunction with 2 other diode structures rotating with each other at the same speed, but at a different speed than the first to diode structures. The relative position may be varied, for example, by employing an indexing coupling in a drive train that drives the subdivided fluid diode structures or one or more pairs of diode structures, for example and without limitation, in a manner such as that described herein below.

Fluid diode structures 33 and 35 are configured, in the same or similar manner to that set forth above with respect to fluid diode 22, to generate rotating regions that rotate or travel at the same speed as the rotating continuous detonation wave. The rotating regions include one or more rotating regions 75 of relative misalignment of the fluid flow passages of diode structures 33 and 35, and a corresponding number of each of rotating regions 77 and 79 of relative alignment of the fluid flow passages of diode structures 33 and 35 (similarly, one or more rotating regions of relative alignment of the fluid flow blockages of diode structures 33 and 35, and the corresponding number of rotating regions of relative misalignment of the fluid flow blockages of diode structures 33 and 35, respectively). The rotating regions 75, 77 and 79 are configured to travel or rotate at the same speed as the continuous detonation combustion wave in the same or similar manner to that described above with respect to rotating regions 74 and 76.

In the depiction of FIG. 15, the rotating regions 75, 77 and 79 formed by fluid diode 22 are illustrated as having particular proportions relative to one another. However, it will be understood that fluid diode structures 33 and 35 may be configured to form a rotating regions 75, 77 and 79 in any desired size wherein the combined arc length of rotating 75, 77 and 79 are less than 360°. In some embodiments, the circumferential length of the fluid flow passages in one of the diode structures may be changed relative to the circumferential length of the fluid flow passages in the other of the diode structures in order to generate rotating regions having different circumferential lengths relative to each other. In some embodiments, such as those described herein, the effective circumferential length of the fluid flow passages may be varied on-the-fly, i.e. during the operation of combustion system 15 by subdividing fluid diode structures 33 and/or 35 into 2 or more rotating components each, wherein one of the rotating components has fluid flow passages having a length in the circumferential direction that is different than the fluid flow passages of the other component, and by varying the relative position e.g. angular position, between the rotating components. Such a configuration is equivalent to having 2 diode structures rotating with each other at the same speed employed in conjunction with 2 other diode structures rotating with each other at the same speed, but at a different speed than the first to diode structures. The relative position may be varied, for example, by employing an indexing coupling, for example and without limitation, in a manner such as that described herein below. In some embodiments, the relative angular positions of diode structures 33 and 35 may be varied for example via the use of an indexing coupling in a drive train that drives diode structure 33 and/or diode structure 35.

As previously mentioned, pressure in lower pressure zones 80 between rotating continuous combustion waves 70 is less than the supply pressure of the oxidant supplied by fluid diode 22, and less than the supply pressure of fuel supplied via fluid diode 23. That is, the supply pressures of the fuel and oxidant are selected to be higher than the pressure in pressure zones 80.

By positioning regions 75 adjacent to rotating continuous detonation waves 70, back-flow resulting from the higher pressure zones 78 associated with the detonation combustion waves is reduced or eliminated. By positioning regions 77 and 79 in lower pressure zones 80 away from rotating continuous detonation waves 70, where the fuel supply pressure is higher than the pressure in lower pressure zones 80, flow, e.g., of fuel, into combustion chamber 24 is permitted. Thus, in various embodiments, one or more portions of fluid diode 23 may restrict or prevent flow in back-flow direction 28, while at the same time one or more other portions of fluid diode 23 permit flow through to combustion chamber 24 in primary flow direction 26, e.g., depending upon circumferential location in a moving reference frame associated with rotating continuous detonation waves 70 and regions 75, 77 and 79. The fuel/oxidant mixture admitted into combustion chamber 24 via fluid diodes 22 and 23 is combusted upon the approach of the next rotating continuous detonation waves 70 to arrive at the location of the admitted fuel/oxidant mixture, thus continuing the detonation process.

Figure 16:
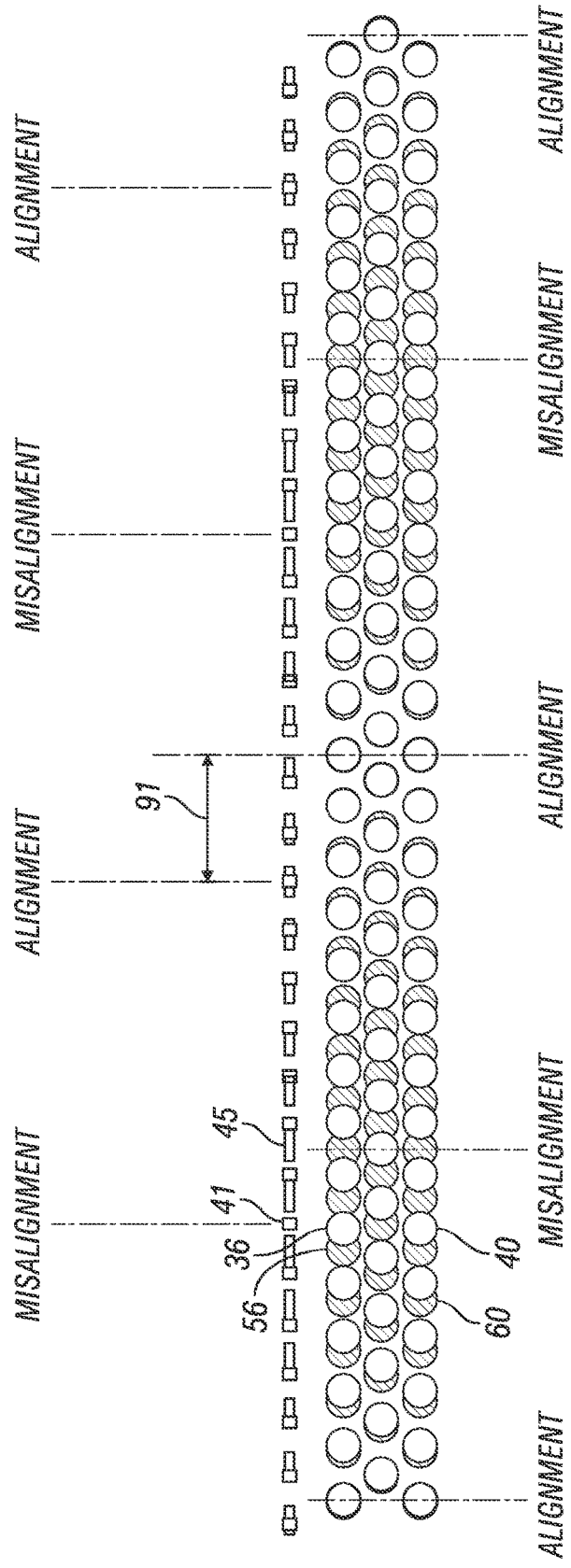
FIG. 16 schematically illustrates some aspects of a non-limiting example of fluid diodes in accordance with an embodiment of the present disclosure.

Referring to FIG. 16, some aspects of a non-limiting example of fluid diodes 33 and 35 in accordance with an embodiment of the present disclosure are schematically depicted. The depiction of FIG. 16 is schematic in nature, and illustrates the fluid flow passages of diode structures 32 and 34 as being the same size, and also illustrates fluid flow passages 41 and 45 of diode structures 33 and 35, respectively. The alignment of the fluid flow passages and at the misalignment of the fluid flow passages are depicted, and illustrate an offset 91 in the positions of alignment and misalignment of the fluid flow passages in diode structures 33 and 35 relative to diode structure 32 and 34, respectively.

Figure 17:
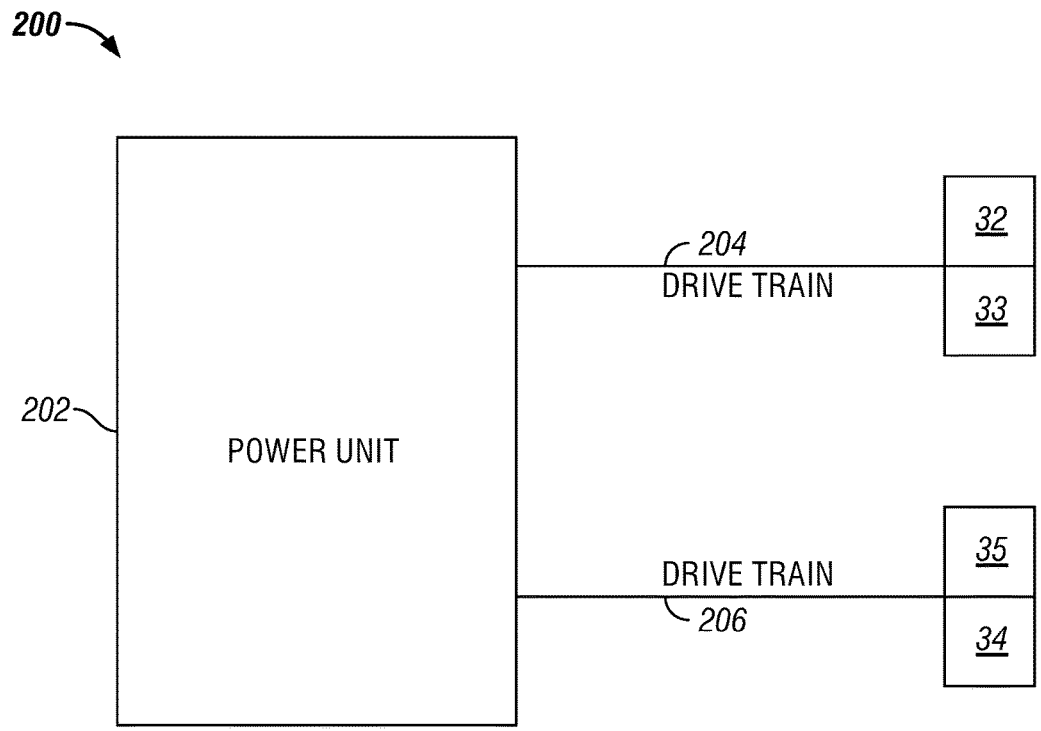
FIG. 17 schematically illustrates some aspects of a non-limiting example of a drive system in accordance with an embodiment of the present disclosure.

Referring to FIG. 17, some aspects of a non-limiting example of a drive system 200 in accordance with an embodiment of the present disclosure is schematically depicted. Drive system 200 includes a mechanical power unit 202, such as an electrical motor, a rotor or spool of a gas turbine engine, or another source of mechanical power. Mechanical power unit 202 is coupled to diode structures 32 and 33 via a drive train 204, e.g. a shafting system and/or gear system and/or belt system, and is operative to drive diode structure 32 and 33 at the same rotational speed. Mechanical power unit 202 is coupled to diode structures 34 and 35 via a drive train 206, e.g. a shafting system and/or gear system and/or belt system, and is configured to drive diode structures 34 and 35 at the same rotational speed, but at a different rotational speed than diode structures 32 and 33 in a manner set forth previously above.

Figure 18:
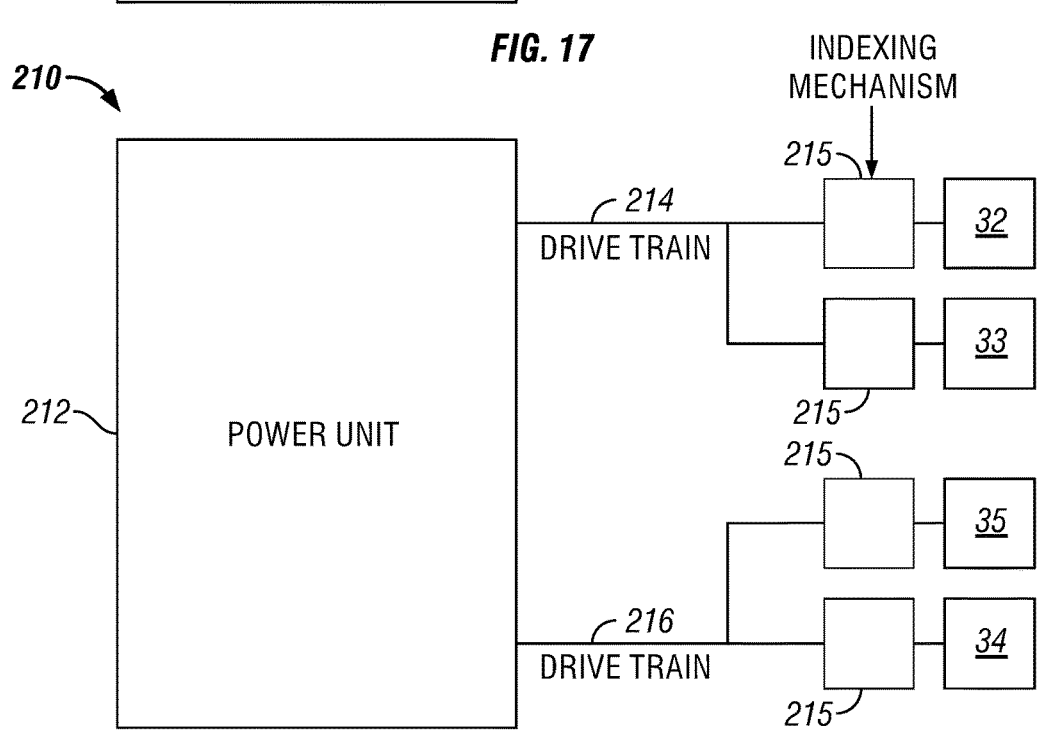
FIG. 18 schematically illustrates some aspects of a non-limiting example of a drive system in accordance with an embodiment of the present disclosure.

Referring to FIG. 18, some aspects of a non-limiting example of a drive system 210 in accordance with an embodiment of the present disclosure is schematically depicted. Drive system 210 includes a mechanical power unit 212, such as an electrical motor, a rotor or spool of a gas turbine engine, or another source of mechanical power. Mechanical power unit 212 is coupled to diode structures 32 and 33 via a drive train 214, e.g. a shafting system and/or gear system and/or belt system, and is operative to drive diode structure 32 and 33 at the same rotational speed. Drive train 214 includes an indexing mechanism 215 that is configured to vary the angular position of diode structure 33 relative to diode structure 32 on the fly, i.e., during the operation of rotating detonation combustion system 15. In one form, indexing mechanism 215 is an indexing coupling. In other embodiments, indexing mechanism 215 may take other forms. In some embodiments, indexing mechanism 215, illustrated in dashed lines, may also or alternatively be employed to vary the angular position of diode structure 32 relative to diode structure 33. Mechanical power unit 212 is coupled to diode structures 34 and 35 via a drive train 216, e.g. a shafting system and/or gear system and/or belt system, and is configured to drive diode structures 34 and 35 at the same rotational speed, but at a different rotational speed than diode structures 32 and 33 in a manner set forth previously above. In some embodiments, drive train 216 may include indexing mechanism 215, illustrated in dashed lines, to vary the angular position of diode structure 35 relative to diode structure 34. In some embodiments, an indexing mechanism 215, illustrated in dashed lines, may also or alternatively be employed to vary the angular position of diode structure 33 relative to diode structure 32 and/or vary the angular position of diode structure 32 relative to diode structure 33. By varying the angular positions of one or more diode structures relative to another one or more diode structures on-the-fly, the fuel introduction lag may be so varied, and/or the stoichiometry of the detonation waves may be so varied, and hence dilution layer 126 and fuel introduction region 81 may be so varied, thereby reducing or eliminating deflagrative combustion at or in the vicinity of interface 122, and throttling the output of the continuous detonation combustion system 15.

Figure 19:
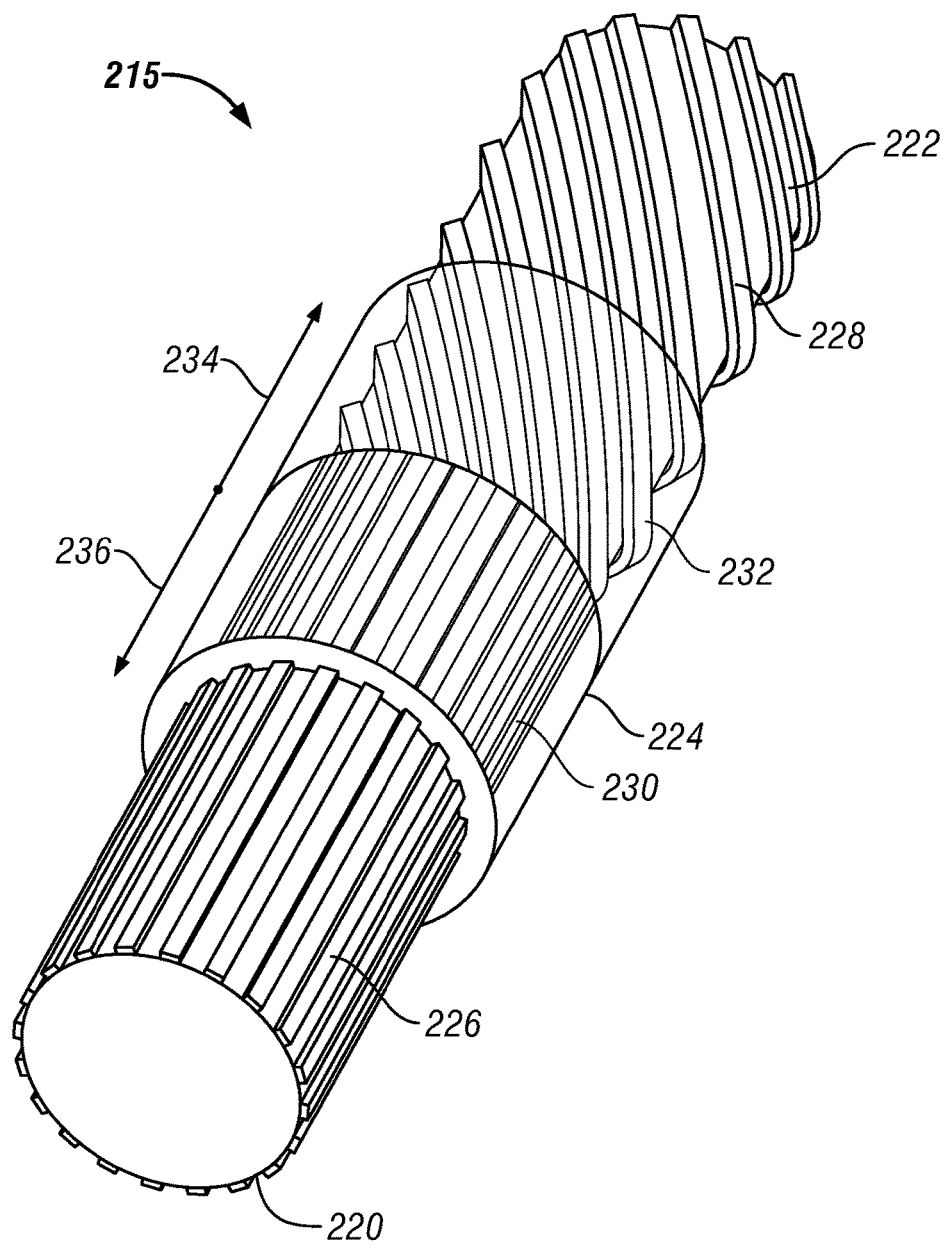
FIG. 19 schematically illustrates some aspects of a non-limiting example of an indexing mechanism in the form of an indexing coupling in accordance with an embodiment of the present disclosure.

Referring to FIG. 19, some aspects of a non-limiting example of an indexing mechanism 215 in the form of an indexing coupling in accordance with an embodiment of the present disclosure is schematically illustrated. Indexing coupling 215 includes a shaft portion 220 and shaft portion 222 that are coupled together by a splined coupling 224. In other embodiments, shaft portion 220 and shaft portion 222 may be coupled together by other means, for example a coupling having an angled pin and slot arrangement at one end and a straight spline or pin and slot arrangement. In the depicted embodiment, shaft 220 includes straight splines 226, and shaft portion 222 includes angled or helical splines 228. In other embodiments, other splined configurations may be employed for example, splines on each shaft having opposite helical angles or different helical angles. Coupling 224 includes internal straight and helical splines 230 and 232 configured to mate with the splines of shaft portion 220 and shaft portion 222, which are illustrated in dashed lines. By moving splined coupling 224 in direction 234, the relative angular position between shaft portion 220 and shaft 222 is varied in one direction, and by moving splined coupling 224 in opposite direction 236, the relative angular position between shaft portion 220 and shaft 222 is varied in the opposite direction, thereby indexing shaft portion 220 relative to shaft portion 222.

Figure 20:
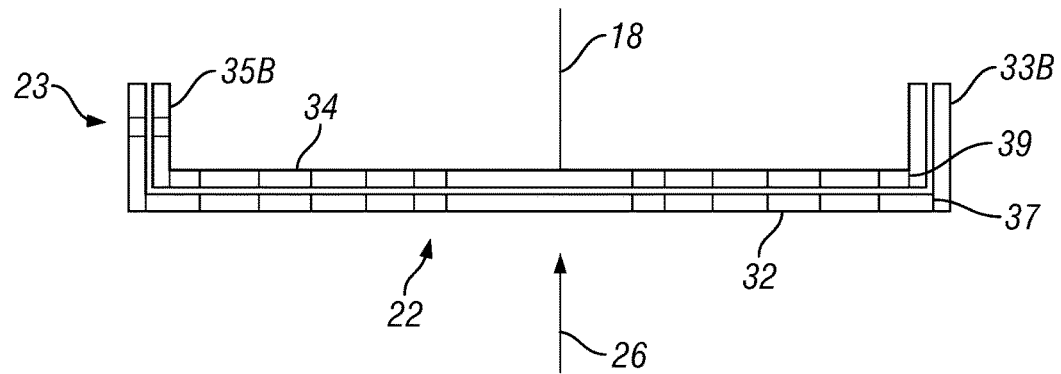
FIG. 20 schematically illustrates some aspects of non-limiting examples of diode structures in accordance with embodiments of the present disclosure are schematically depicted.

Referring to FIG. 20, some aspects of non-limiting examples of diode structures 22 and 23 in accordance with embodiments of the present disclosure are schematically depicted. In the embodiment of FIG. 11, fluid diode 22 includes diode structures 32 and 34 having the same form as previously set forth, e.g., circular plates. In the embodiment of FIG. 11, fluid diode 23 is cylindrically shaped, whereas fluid diode structure 33B is coupled to, affixed to or integral with diode structure 32, or rotate with diode structure 32 but without being coupled thereto, as described previously, and as indicated by dashed lines 37 and 39. In the illustrated embodiment, fluid diode structures 32, 34, 33, and 35 include the same fluid flow passages described previously. In other embodiments, other fluid flow passages may be employed. In the depiction of FIG. 20, the cylindrical diode structures 33 and 35 extended in direction 26. In other embodiments, the cylindrical diode structure 33 and 35, or diode structures 33 and 35 of any body of revolution, may extend in direction 26, direction 28 or both. In embodiments, using fuel flow within the diodes, the cooling may be enhanced by transfer from the diode member to the fuel. The fuel passages may be designed so as to provide a degree of cooling uniformity and effectiveness. Fuel introduction via the side wall may add cooling to the side wall structure. Introduction of air flow in to the space between the rotating diodes can be made to provide additional cooling.

Figure 21:
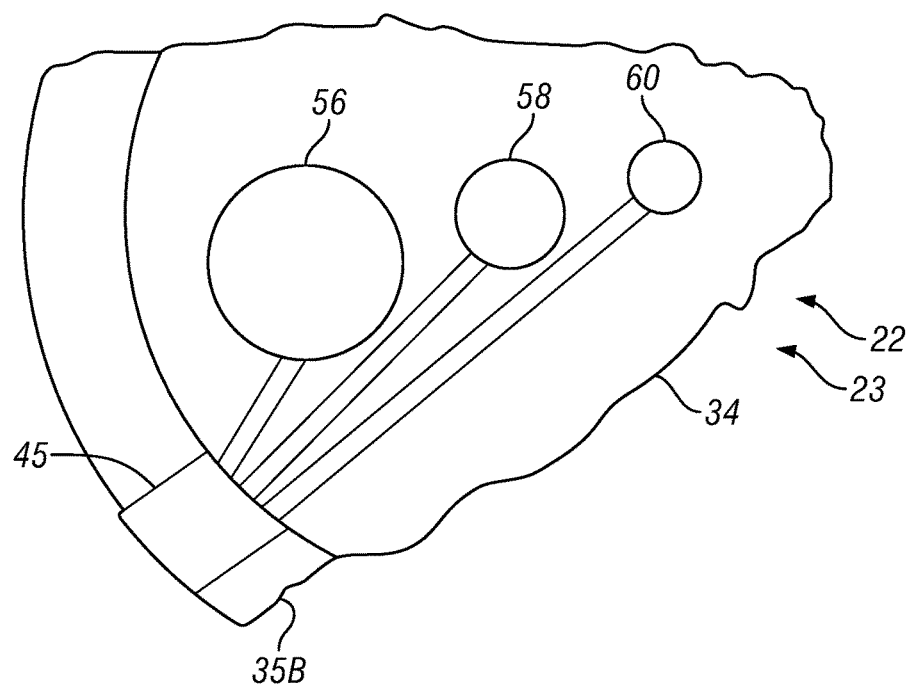
FIG. 21 schematically illustrates some aspects of non-limiting examples of diode structures in accordance with embodiments of the present disclosure are schematically depicted.

Referring to FIG. 21, some aspects of a nonlimiting example of fluid diode 22 and 23 in accordance with an embodiment of the present disclosure are schematically depicted. In the embodiment of FIG. 20, fluid flow passages fluid diode 23, e.g., diode structure 35, are configured to direct fuel flow into the fluid flow passages of fluid diode 22, e.g., diode structure 34, which may enhance the mixing of the fuel and the oxidant, and also provide cooling to the diode structures. In some embodiments, fuel is provided through fuel transfer passages leading from the fuel feed passages to fluid flow passages in the same diode structure to introduce fuel into the air as the air travels through the fluid flow passages. In some embodiments, a single fuel valve supplies multiple rows of fluid flow passages.

Figure 22:
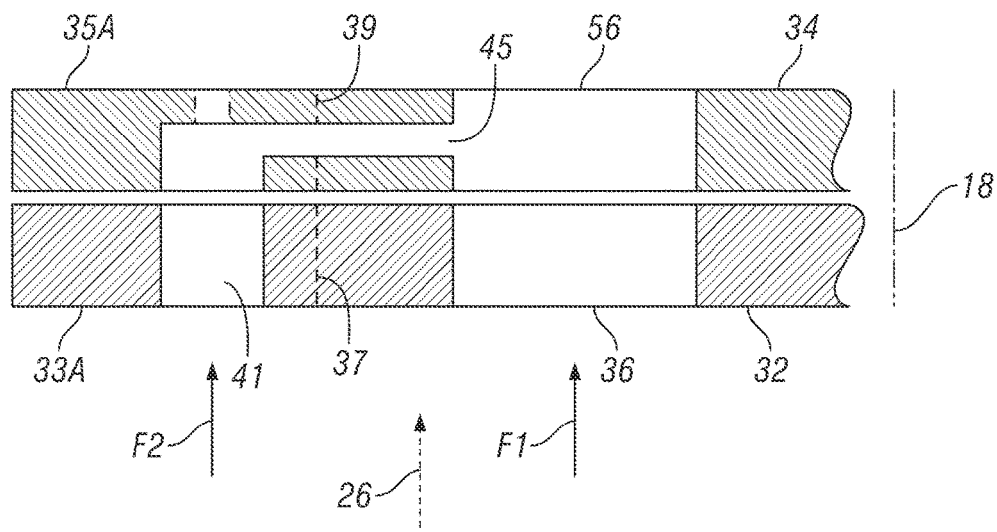
FIG. 22 schematically illustrates some aspects of non-limiting examples of diode structures in accordance with embodiments of the present disclosure are schematically depicted.

Referring to FIG. 22, some aspects of a non-limiting example of fluid diodes 22 and 23 in accordance with an embodiment of the present disclosure are schematically depicted. In the embodiment of FIG. 21, fluid flow passages fluid diode 23, e.g., diode structure 35, are configured to direct fuel flow (F2) into the fluid flow passages of fluid diode 22, e.g., diode structure 34, which may enhance the mixing of the fuel and the oxidant (F1), and also provide cooling to the diode structures.

Figure 23:
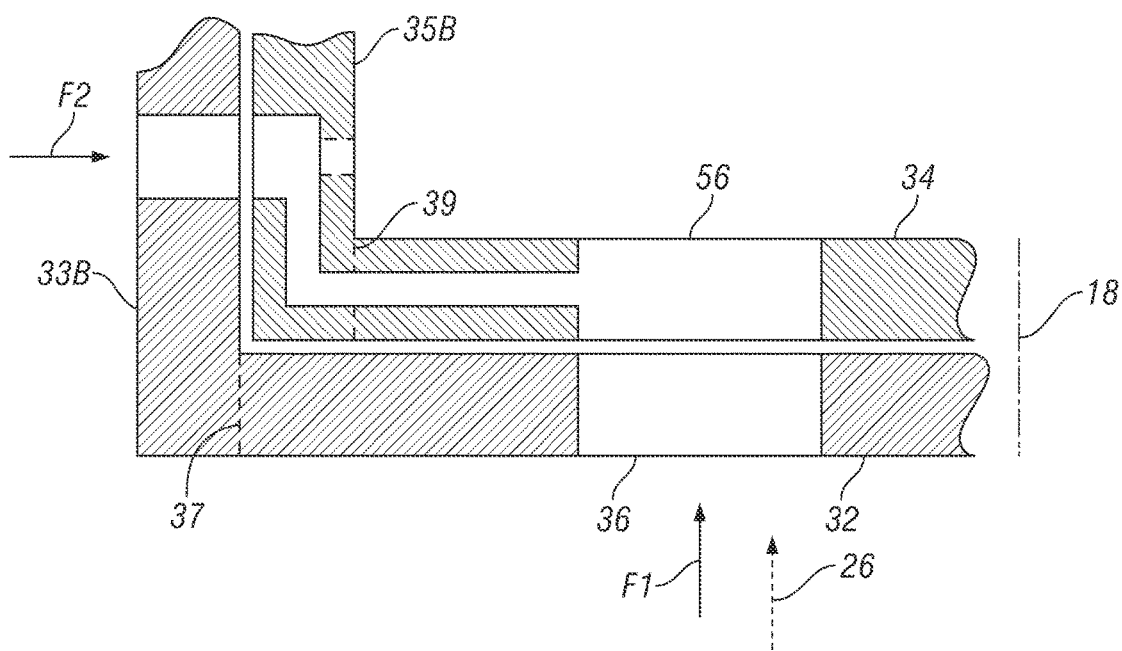
FIG. 23 schematically illustrates some aspects of non-limiting examples of diode structures in accordance with embodiments of the present disclosure are schematically depicted.

Referring to FIG. 23, some aspects of a non-limiting example of fluid diodes 22 and 23 in accordance with an embodiment of the present disclosure are schematically depicted. In the embodiment of FIG. 22, fluid flow passages fluid diode 23, e.g., diode structure 35, are configured to direct fuel flow (F2) into the fluid flow passages of fluid diode 22, e.g., diode structure 34, which may enhance the mixing of the fuel and the oxidant (F1), and also provide cooling to the diode structures.

Figure 24:
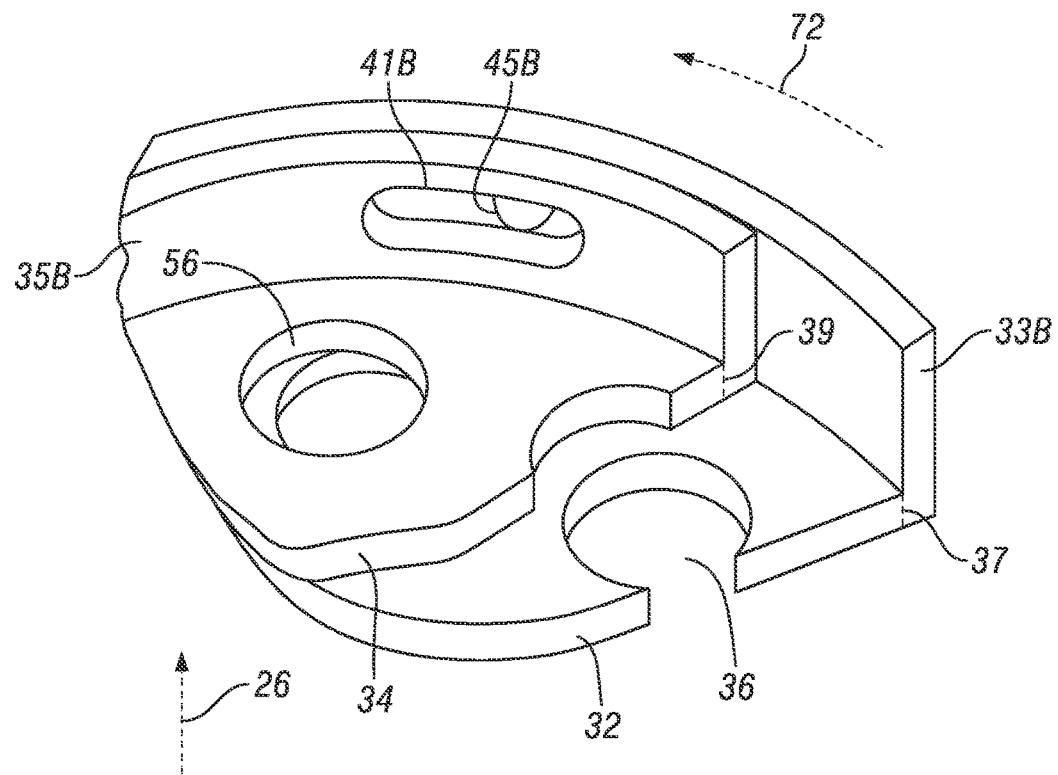
FIG. 24 schematically illustrates some aspects of non-limiting examples of diode structures in accordance with embodiments of the present disclosure are schematically depicted.

Referring to FIG. 24, some aspects of a non-limiting example of fluid diode structure 22 and 23 in accordance with an embodiment of the present disclosure are schematically depicted. Fluid flow passage 41B is depicted in the form of a slot in diode structure 35B, whereas fluid flow passage 45B is depicted in the form of a circular hole in diode structure 33B. In other embodiments, the slot may be in diode structure 35B, and the hole may be in diode structure 33B. In other embodiments, any suitable size shape and circumferential length of fluid flow passages may be employed in accordance with the teachings herein.

Figure 25:
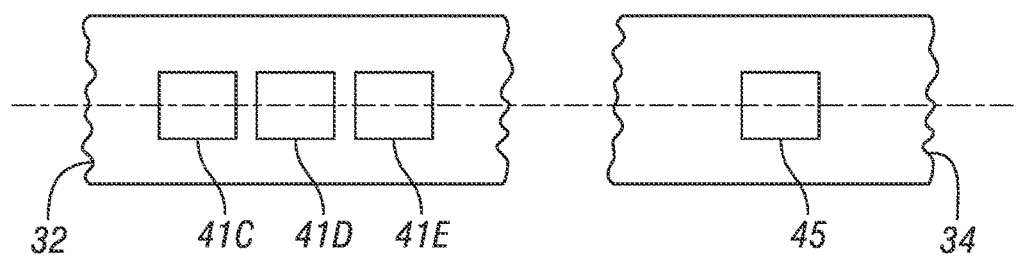
FIG. 25 schematically illustrates some aspects of non-limiting examples of diode structures in accordance with embodiments of the present disclosure are schematically depicted.
Figure 26:
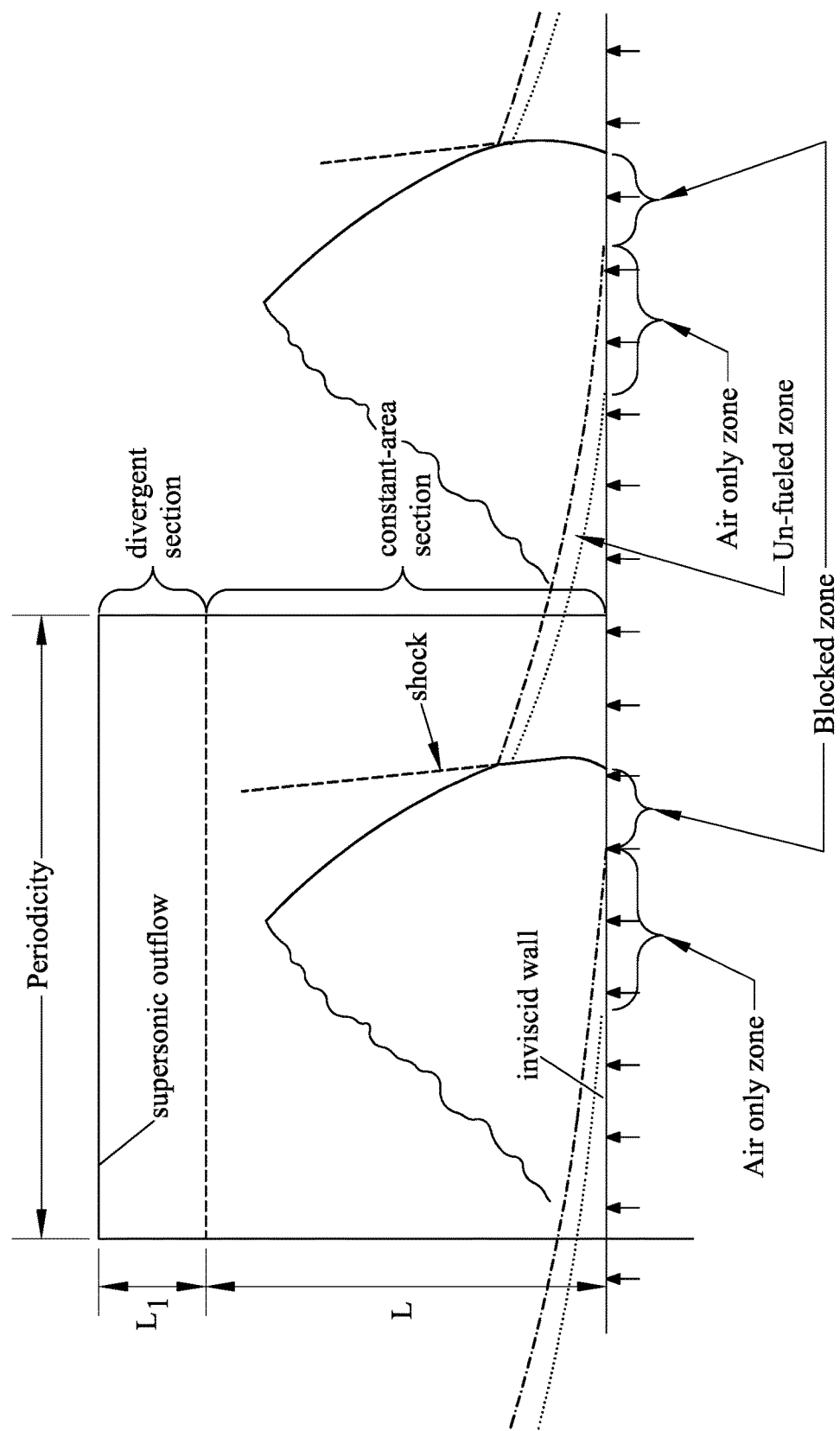
FIG. 26 schematically depicts 2 rotating detonation combustion waves.

Referring to FIG. 25, some aspects of a non-limiting example of fluid diode structures 22 and 23 in accordance with an embodiment of the present disclosure are schematically depicted. In the depiction of FIG. 25, slot 41 is subdivided into sub-portions 41C, 41D and 41E, wherein the combined circumferential length of sub-portions 41C, 41D and 41E add up to the same length as the previously described slot 41, as configured to generate the rotating regions previously described. In other embodiments, slot 41 may be subdivided into a greater or lesser number of sub-portions. In various embodiments, one or more of sub-portions 41C, 41D and 41E may be blocked, or exposed to different fixed and/or modulated fuel flow sources that alter the stoichiometry of the detonation waves 70, thereby varying, on-the-fly, the fuel introduction lag, and/or the stoichiometry of the detonation waves, and hence dilution layer 126 and fuel introduction region 81, thereby reducing or eliminating deflagrative combustion at or in the vicinity of interface 122, and throttling the output of the continuous detonation combustion system 15, without the use of an offset mechanism. The sub-portions may be supplied with fuel from separate circuits and independently controlled regarding on, off, or modulated fuel flow, including the ability to effectively throttle the engine, that is operate over a variable range of less than stoichiometric fuel air ratios. The sub-portions and the fuel feed passages may allow flexibility regarding the fueling of the traveling region of the circumference being fueled. In some embodiments, fuel is added to the air via transverse injection from the side. In other embodiments, fuel is added to the air via fuel transfer passages to the fluid flow passages in one or more of the diodes.

Throttling of a continuous detonation combustor, also known as a rotating detonation combustor, may be accomplished by continually introducing a region of dilution air behind the detonative event between the vitiated gases produced by the detonative event and simultaneously supplying fuel into a region into which the detonative combustion event is moving. This region is caused by the introduction of a transiently moving fuel supply pattern created by application of a valve of like kind of the Continuous Detonation Pressure Gain Combustor Flow Diode Valve. This valve may be used to control fuel flow either together with or separate from the air valve acting on the bulk of the combustor flow. The option for the described valve application to control only the addition of dilution air is also envisioned. In which case, fuel is introduced in manners previously utilized.

The particular application of the valve device schedules fuel introduction in one or more moving regions immediately adjacent to and behind or ahead of the traveling detonation or detonations of a continuous detonation combustor. The valve, as previously disclosed and recorded, operates on the principle of two or more disks or plates or spoked rotors or elements having sets of holes, slots, or openings through the plate, which move relative to each other. They may move at different, but closely matched, mechanical speeds. The difference in speeds, together with the number, spacing, and patterns of the openings, creates open and closed regions that travel around the annulus at a speed greater than either of the disks. Thus, the speed of the region of closed area and open area may be made to match the speed of detonation without requiring either of the plates to travel at the speed of the detonation.

The valve works on the general principles of the Vernier scale, in which the position of markings in alignment moves a greater distance than the traveling distance of the sliding element. In this disclosure, the position of the holes or features in alignment, or greatest misalignment, moves a greater distance than the plates having the holes. It is envisioned that the flow direction through the valve may be predominately axial, predominately radial, or a combination of both (also with some amount of swirl). It is also envisioned that the orientation of the plates, disks, or elements may be either flat plate, cylinder, or conical configuration including curved surfaces for any of the types. One of the elements may be stationary. Although rotation is illustrated as the method of achieving the intended motion, methods other than rotation or used in combination with rotation are envisioned. Furthermore, the rotation or translation of one or more of the plates relative to each other is envisioned to be either in the same direction or counter in direction to each other.

The application of the valve utilizes the opening and closing of the passages to introduce fuel into air, including stratification of charge, to promote detonation and/or to create a non-fueled or lean layer of air between sequenced detonations. This also serves to eliminate or reduce deflagrative burning at the interface of combustion and non-combusted fuel air mixture as commonly occurs in these devices. The valve acts to introduce fuel within the flowpath of the combustor only after some air has been introduced not having fuel added after the detonation event has passed. When used with the previously disclosed valve, this sequence of no or reduced fuel addition occurs or is located after the closed period of the air valve. The net effect of the introduction of the additional or un-fueled air is the lowering of the overall fuel air ratio of the combustor and, hence, the lowering of the bulk mixed exiting temperature of the gases produced by the combustor and, thus, acts to provide a throttling feature to a continuous detonation combustor.

The disclosure relates to a device that creates the opportunity to control the flow of fuel of a continuous detonation combustor, also known as a rotating detonation combustor, so that the overall fuel air ratio of the combustor can be reduced below the stoichiometric ratio, thus adding a throttling ability. This is a feature that was previously identified as not possible for a continuous detonation engine. The introduction of a region of low or non-fueled region acts to reduce or eliminate the deflagrative burning that occurs in continuous detonation combustors of the conventional type, thus improving the pressure gain potential for a given fuel consumption. The allowable fuel air ratios over which a continuous detonation engine or pressure gain combustor is operable is held to a restrictive range by detonability limits particular to the fuel and air combination and near the stoichiometric fuel air ratio. The ability to throttle allows the device to be applicable to use as the main combustor of a gas turbine engine whose turbine inlet temperature is required to be below the level of stoichiometric fuel air ratio or requires modulation in the power or thrust output level.

This device allows the fueled region, into which the detonation continually travels, to be within the allowable range for detonation while allowing a portion of air to act as dilution without interfering with the continuous detonation properties. The dilution air is presented as layers within the gas moving downstream of the combustion region and mixes with the vitiated gas products due to turbulence. Because it is introduced within a region of relatively low pressure behind the detonation wave, the pressure of supply is below that of the region of pressure gain across the combustor. This dilution air region is acted upon by the shock process created as a result of the detonation in the downstream region and thereby indirectly compressed by the detonative combustion event and, thus, attained the pressure gain state. The density gradient at the interfaces between the hot vitiated products of detonative combustion and the cooler dilution gas, when experiencing the passing motion of the strong pressure gradient from the shock, experiences strong generation of vorticity at the interface due to baroclinic instabilities. This vorticity creates strong mixing at the interfaces. The low flow loss characteristic of the previously disclosed valve allows a low pressure loss method of introduction of the dilution air.

A moving mechanical feature accomplishing the same function when traveling at the speed of the detonation can be suggested. This may include speeds of approximately 6000 feet per second in the annulus. In this disclosure, the regions of translating fueled and un-fueled regions may move at a velocity equal to that of the detonation without causing a structure to travel at such velocities which would result in high or prohibitively high stress levels in the moving structure. Through the use of the device, it is anticipated that the stresses within the structure may be within those of known design practice suing known materials.

Some continuous detonation combustors experience continuously high heat flux from the detonative combustion. The device described may reduce the average level of high heat flux by introduction of the un-fueled region. Positions are intermittently heated by the passing combustion and then cooled by the arriving flow of non-vitiated flow traversing the combustor. Mixing of the two regions occurs as a consequence of the flow traversing to the combustor exit including, but not limited to, known mechanisms of turbulence of various scales. Additional mixing features can be used to enhance mixing as needed.

While the invention has been described in connection with what is presently considered to be the most practical and preferred embodiment, it is to be understood that the disclosure is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the disclosure, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A combustion system configured for continuous detonation combustion, comprising:
an annular combustion chamber having a centerline axis, the annular combustion chamber configured to contain therein a rotating continuous detonation wave; and
a first fluid diode positioned flow-wise upstream of the combustion chamber, including a first rotating diode structure and a second rotating fluid diode structure; and wherein the first fluid diode is configured to form, with the first diode structure and the second diode structure, during operation of the combustion system:
a first rotating region rotating at a speed that is the same as a speed of the rotating continuous detonation wave, wherein the first rotating region has a first flow area through the first fluid diode; and wherein the first rotating region is positioned adjacent to the rotating continuous detonation wave at a higher pressure zone of the rotating continuous detonation wave; and a second rotating region rotating about the combustion chamber at the same speed as the rotating continuous detonation wave, wherein the second rotating region has a second flow area through the first fluid diode of a greater magnitude than a magnitude of the first flow area; and wherein the second rotating region is positioned adjacent to a lower pressure zone circumferentially of the rotating continuous detonation wave downstream of the higher pressure zone, wherein the first rotating diode structure and the second rotating diode structure rotate around the centerline axis.

2. The combustion system of claim 1, wherein the first rotating region is configured to reduce or prevent a backflow from the combustion chamber through the first fluid diode at the higher pressure zone.

3. The combustion system of claim 1, wherein the second rotating region is configured to introduce a first fluid into the combustion chamber in the lower pressure zone.

4. The combustion system of claim 3, wherein the first fluid is an oxidant.

5. The combustion system of claim 3, further comprising a second fluid diode configured to introduce a second fluid into the combustion chamber in the lower pressure zone circumferentially downstream of a leading portion of the lower pressure zone.

6. The combustion system of claim 5, wherein the first fluid diode is configured to introduce air into the lower pressure zone at a first location; and wherein the second fluid diode is configured to introduce a fuel into the lower pressure zone at a second location circumferentially downstream of the first location, and to form an air-only zone in the lower pressure zone.

7. The combustion system of claim 6, wherein the second fluid diode is configured to lag the fuel introduction circumferentially behind the oxidant introduction.

8. The combustion system of claim 7, wherein the second fluid diode is configured to vary the amount of fuel introduction lag.

9. The combustion system of claim 7, wherein the second fluid diode is configured to vary the amount of fuel introduction lag on the fly during operation of the combustion system.

10. The combustion system of claim 5, further comprising the second fluid diode positioned flow-wise upstream of the combustion chamber, including a third rotating diode structure and a fourth rotating fluid diode structure; wherein the second fluid diode is configured to form, with the third diode structure and the fourth diode structure, during operation of the combustion system:

a third rotating region rotating about the combustion chamber at the same speed as the rotating continuous detonation wave, wherein the third rotating region is configured to have a third flow area through the second fluid diode; and wherein the third rotating region is positioned adjacent to the rotating continuous detonation wave at the higher pressure zone of the rotating continuous detonation wave; and a fourth rotating region rotating about the combustion chamber at the same speed as the rotating continuous detonation wave, wherein the fourth rotating region is configured to have a fourth flow area through the second fluid diode greater in magnitude than the third flow area; wherein the fourth rotating region is positioned adjacent to the lower pressure zone circumferentially downstream of the higher pressure zone of the rotating continuous detonation wave; and wherein a leading portion of the fourth rotating region circumferentially lags a leading portion of the second rotating region.

11. The combustion system of claim 10, wherein the first rotating diode structure has a plurality of first fluid flow passages; wherein the second rotating fluid diode structure has a plurality of second fluid flow passages; wherein the number of first fluid flow passages is different than that of the second fluid flow passages; wherein the first rotating diode structure and the second rotating diode structure are configured to rotate at different rotational speeds; wherein the first flow area of the first rotating region is formed by at least a partial misalignment of a first subset of the plurality of first fluid flow passages with a first subset of the second plurality of fluid flow passages; and wherein the second flow area of the second rotating region is formed by at least a partial alignment of a second subset of the plurality of first fluid flow passages with a second subset of the plurality of second fluid flow passages; and wherein the third rotating diode structure has a plurality of third fluid flow passages; wherein the fourth rotating fluid diode structure has a plurality of fourth fluid flow passages; wherein the number of third fluid flow passages is different than that of the fourth fluid flow passages; wherein the second rotating diode structure and the third rotating diode structure are configured to rotate at different rotational speeds; wherein the third flow area of the third rotating region is formed by at least a partial misalignment of a first subset of the plurality of third fluid flow passages with a first subset of the plurality of fourth fluid flow passages; and wherein the fourth flow area of the fourth rotating region is formed by at least a partial alignment of a second subset of the plurality of third fluid flow passages with a second subset of the plurality of fourth fluid flow passages.

12. The combustion system of claim 10, wherein the first fluid diode and the second fluid diode are configured to introduce an air dilution layer at a circumferentially aft portion of the rotating continuous detonation wave.

13. The combustion system of claim 10, wherein the third rotating region is configured to reduce or prevent backflow from the combustion chamber through the second fluid diode; and wherein the fourth rotating region is configured to pass the second fluid into the combustion chamber through the second fluid diode.

14. The combustion system of claim 10, wherein the first fluid diode is configured to introduce a first fluid into the combustion chamber in the lower pressure zone; wherein the first fluid is an oxidant; and wherein the second fluid includes a fuel, and the combustion system further comprising a drive train system configured to supply rotation to the first diode structure, the second diode structure, the third diode structure and the fourth diode structure, wherein the drive train system is configured to rotate the first diode structure and the third diode structure at a first rotational speed; wherein the drive train system is configured to rotate the second diode structure and the fourth diode structure at a second rotational speed different than the first rotational speed; wherein the drive train system is configured to vary the angular relationship between the second diode structure and the fourth diode structure to circumferentially lag the introduction of the second fluid behind the introduction of the first fluid and to vary the amount of lag on the fly during operation of the combustion system.

15. The combustion system of claim 14, wherein the drive train system includes an indexing coupling in mechanical communication with the fourth diode structure and configured to vary the angular relationship between the second diode structure and the fourth diode structure to vary the amount of lag on the fly during operation of the combustion system.

16. The combustion system of claim 10, wherein the first diode structure, the second diode structure, the third diode structure and the fourth diode structure rotate at speeds lower than the speed of the rotating continuous detonation wave.

17. A gas turbine engine, comprising:
a compressor system;
a combustion system having an annular combustion chamber having a centerline axis and the annular combustion chamber being in fluid communication with the compressor system and configured to contain therein a rotating continuous detonation wave; and
a turbine system in fluid communication with the combustion system,
wherein the combustion system includes a first fluid diode having a first diode structure and a second diode structure disposed adjacent to the first diode structure; wherein the first fluid diode is configured for relative motion between the first diode structure and the second diode structure to form a first rotating region and a second rotating region, each of which rotate at the same rotational speed as the rotating continuous detonation wave, but wherein the first diode structure and the second diode structure rotate at a lower speed than that of the rotating continuous detonation wave; wherein the first rotating region is positioned adjacent to the rotating continuous detonation wave at a higher pressure zone and configured to reduce or prevent backflow from the combustion chamber through the first fluid diode at the higher pressure zone; and wherein the second rotating region is configured to introduce air into the combustion chamber in the lower pressure zone; and
wherein the combustion system includes a second fluid diode having a third diode structure and a fourth diode structure disposed adjacent to the third diode structure; wherein the second fluid diode is configured for relative motion between the third diode structure and the fourth diode structure to form a third rotating region and a fourth rotating region, each of which rotate at the same rotational speed as the rotating continuous detonation wave, but wherein the third diode structure and the fourth diode structure rotate at a lower speed than that of the rotating continuous detonation wave; wherein the third rotating region is positioned adjacent to the rotating continuous detonation wave at a higher pressure zone and configured to reduce or prevent backflow from the combustion chamber through the second fluid diode at the higher pressure zone; and wherein the fourth rotating region is configured to introduce at least some fuel into the combustion chamber in the lower pressure zone,
wherein the first fluid diode and the second fluid diode rotate around the centerline axis.

18. The gas turbine engine of claim 17, further comprising a drive train system configured to lag the introduction of the at least some fuel behind the introduction of the air and to vary the amount of fuel introduction lag on the fly during operation of the gas turbine engine.

19. The gas turbine engine of claim 17, further comprising a drive train system configured to supply rotation to the first diode structure, the second diode structure, the third diode structure and the fourth diode structure; wherein the drive train system is configured to rotate the first diode structure and the third diode structure at a first rotational speed; wherein the drive train system is configured to rotate the second diode structure and the fourth diode structure at a second rotational speed different than the first rotational speed; and wherein the drive train system includes an indexing coupling in mechanical communication with the fourth diode structure and configured to vary the angular relationship between the third diode structure and the fourth diode structure to vary the amount of fuel introduction lag on the fly during operation of the gas turbine engine.

* * * * *